United States Patent
Cohn et al.

(10) Patent No.: US 10,291,507 B2
(45) Date of Patent: May 14, 2019

(54) IMPLEMENTING A VIRTUAL TAP IN A VIRTUAL TOPOLOGY

(71) Applicant: Oracle International Corporation, Redwood Shores, CA (US)

(72) Inventors: Daniel Cohn, Oakland, CA (US); Pradeep Vincent, Kenmore, WA (US)

(73) Assignee: Oracle International Corporation, Redwood Shores, CA (US)

( * ) Notice: Subject to any disclaimer, the term of this patent is extended or adjusted under 35 U.S.C. 154(b) by 282 days.

(21) Appl. No.: 15/431,426

(22) Filed: Feb. 13, 2017

(65) Prior Publication Data

US 2018/0234322 A1   Aug. 16, 2018

(51) Int. Cl.
  *G06F 15/16* (2006.01)
  *H04L 12/26* (2006.01)
  *H04L 12/24* (2006.01)

(52) U.S. Cl.
  CPC .............. *H04L 43/12* (2013.01); *H04L 41/12* (2013.01); *H04L 43/028* (2013.01)

(58) Field of Classification Search
  USPC ........................................................ 709/227
  See application file for complete search history.

(56) References Cited

U.S. PATENT DOCUMENTS

| | | | |
|---|---|---|---|
| 7,602,782 B2 | 10/2009 | Doviak et al. | |
| 7,813,263 B2 | 10/2010 | Chang et al. | |
| 8,224,971 B1 | 7/2012 | Miller et al. | |
| 8,640,220 B1 | 1/2014 | Vincent et al. | |
| 9,274,811 B1 | 3/2016 | Reeves et al. | |
| 9,450,817 B1 | 9/2016 | Bahadur et al. | |
| 9,806,948 B2 | 10/2017 | Masurekar et al. | |

(Continued)

FOREIGN PATENT DOCUMENTS

| CN | 102857475 A | 1/2013 |
|---|---|---|
| CN | 104301321 A | 1/2015 |

(Continued)

OTHER PUBLICATIONS

Cavdar, Cicek, "Optical Networks Virtual Topology Design", Optical Networks Lab (ON Lab), Royal Institute of Technology, Sep. 5, 2012, 69 pages.

(Continued)

*Primary Examiner* — Alicia Baturay
(74) *Attorney, Agent, or Firm* — Invoke

(57) ABSTRACT

Techniques for implementing a virtual tap in a virtual topology are described. A request to tap a particular link between a set of virtual topology entities (VTEs) is received. The particular link between the set of VTEs is mapped to a link between a set of instantiated entities in a physical topology. One of the instantiated elements implements a tapping function. Additionally or alternatively, a tapping element is instantiated and the tapping element implements the tapping function. The tapping element is not one of the set of instantiated entities. The tapping function includes: applying a tap filter to a set of data; replicating the data that passes the tap filter; and transmitting the replicated data to a virtual endpoint. The replicated data may be referred to as "tapped data." A user interface engine presents information regarding the particular link between the set of VTEs based on the tapped data.

20 Claims, 15 Drawing Sheets

(56) References Cited

U.S. PATENT DOCUMENTS

| | | |
|---|---|---|
| 9,825,822 B1 | 11/2017 | Holland |
| 10,013,170 B1 | 7/2018 | Sahin et al. |
| 2003/0189930 A1 | 10/2003 | Terrell et al. |
| 2004/0044758 A1 | 3/2004 | Palmer et al. |
| 2007/0220203 A1* | 9/2007 | Murase .................. G06F 3/0605 711/114 |
| 2009/0182915 A1 | 7/2009 | Farrell et al. |
| 2009/0248896 A1 | 10/2009 | Cohn |
| 2011/0022795 A1* | 1/2011 | Murase .................. G06F 3/0605 711/114 |
| 2013/0163601 A1 | 6/2013 | Kim et al. |
| 2013/0211870 A1 | 8/2013 | Lawson et al. |
| 2013/0212420 A1 | 8/2013 | Lawson et al. |
| 2013/0218909 A1 | 8/2013 | Chu et al. |
| 2015/0074450 A1 | 3/2015 | Blount et al. |
| 2015/0193317 A1 | 7/2015 | Firley |
| 2015/0195137 A1 | 7/2015 | Kashyap et al. |
| 2015/0237117 A1 | 8/2015 | Taylor |
| 2015/0244617 A1 | 8/2015 | Nakil et al. |
| 2016/0094643 A1 | 3/2016 | Jain et al. |
| 2016/0105893 A1 | 4/2016 | Senarath et al. |
| 2016/0218918 A1 | 7/2016 | Chu et al. |
| 2016/0364382 A1 | 12/2016 | Sarikaya |
| 2017/0180154 A1 | 6/2017 | Duong et al. |
| 2017/0302565 A1 | 10/2017 | Ghobadi et al. |
| 2018/0107561 A1* | 4/2018 | Bender .................. G06F 16/188 |
| 2018/0107563 A1* | 4/2018 | Bender ................ G06F 11/1458 |
| 2018/0159801 A1 | 6/2018 | Rajan et al. |
| 2018/0205673 A1 | 7/2018 | Jain et al. |
| 2018/0234298 A1* | 8/2018 | Cohn ...................... H04L 41/12 |
| 2018/0316594 A1 | 11/2018 | Wu et al. |

FOREIGN PATENT DOCUMENTS

| | | |
|---|---|---|
| CN | 104518897 A | 4/2015 |
| CN | 104660553 A | 5/2015 |
| JP | 2012-243254 A | 12/2012 |
| JP | 2015-172964 A | 10/2015 |

OTHER PUBLICATIONS

"Comparison of Firewalls," Wikipedia, available at https://en.wikipedia.org/wiki/Comparison_of_firewalls (accessed on May 6, 2016).

* cited by examiner

IMPLEMENTING A VIRTUAL TAP IN A VIRTUAL TOPOLOGY

TECHNICAL FIELD

The present disclosure relates to computer networks. In particular, the present disclosure relates to implementing a virtual tap in a virtual topology.

BACKGROUND

A computer network provides connectivity among a set of nodes. The set of nodes are connected by a set of links. The nodes may be local to and/or remote from each other. The nodes are connected by one or more links. Examples of links include a coaxial cable, an unshielded twisted cable, a copper cable, an optical fiber, and a virtual link.

A subset of nodes implements the computer network. Such nodes may be referred to as "service nodes." Examples of such nodes include a switch, a router, a firewall, and a network address translator (NAT). Each node performs one or more functions, such as but not limited to routing data, filtering data, inspecting data, processing data, and/or storing data. Each node may be implemented by a function-specific hardware device and/or a generic machine.

Another subset of nodes uses the computer network. Such nodes may be referred to as "hosts" or "host nodes." Hosts may execute a client process and/or a server process. A client process makes a request for a computing service (such as, execution of a particular application, and/or storage of a particular amount of data). A server process responds by executing the requested service and/or returning corresponding data.

A computer network may provide connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Such a computer network may be referred to as a "cloud network."

A computer network may be shared amongst multiple entities that are independent from each other (also referred to as "tenants" or "customers"). The computer network and the network resources thereof are accessed by clients corresponding to different tenants. Such a computer network may be referred to as a "multi-tenant computer network." Different tenants may demand different network requirements for the computer network. The same computer network may need to implement different network requirements demanded by the different tenants.

An entity, such as an individual or company, may request utilization of a computer network including a particular arrangement of digital devices in order to achieve various security, performance, and/or resiliency goals. As data traverses the particular arrangement of digital devices, the digital devices perform respective functions associated with the data. As an example, a security goal of a computer network may be to filter out spam mail. A digital device performing a mail filtering function may be included in the computer network. The digital device may be configured for filtering mail received by the computer network. The digital device may inspect the incoming mail to determine whether the incoming mail includes any spam mail. The digital device filters out the spam mail while forwarding the remaining mail to destinations within the computer network.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
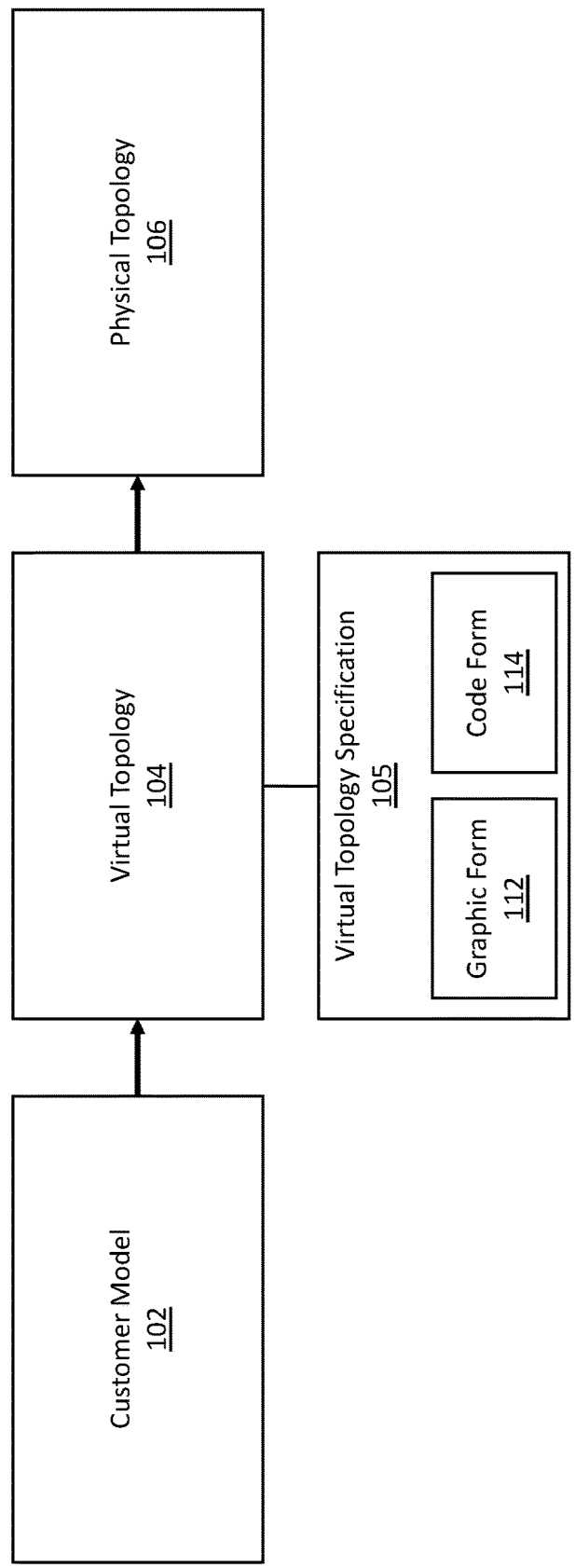
FIG. 1 illustrates relationships between a customer model, a virtual topology, and a physical topology, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. PHYSICAL TOPOLOGIES AND VIRTUAL TOPOLOGIES
3. VIRTUAL TAPPING SYSTEM
4. IMPLEMENTING A VIRTUAL TAP IN A VIRTUAL TOPOLOGY
5. COMPUTER NETWORKS
6. MISCELLANEOUS; EXTENSIONS
7. HARDWARE OVERVIEW

1. General Overview

In one or more embodiments, a computer network is implemented in accordance with a virtual topology that is instantiated on a physical topology.

A physical topology is a particular arrangement of digital devices, such as function-specific hardware devices and/or generic machines.

A virtual topology is a particular arrangement of virtual topology entities (VTEs). Each VTE is associated with one or more functions. Examples of functions include data routing, data filtering, data inspection, data storage, and/or any other type of data processing function. The virtual topology, and the VTEs therein, are specified in a virtual topology specification.

Instantiated elements are executed on a physical topology based on a virtual topology. During instantiation, VTEs of a virtual topology are mapped to digital devices of a physical topology. A VTE may correspond to a digital device itself, or a virtual component executing on the digital device. A single VTE may be mapped to multiple digital devices. Conversely, multiple VTEs may be mapped to a single digital device. A particular digital device mapped to a particular VTE implements the functions corresponding to the particular VTE. The virtual topology specification may but does not necessarily include any reference to a physical topology or digital devices therein. The virtual topology specification may but does not necessarily specify which digital devices of the physical topology perform which functions of which VTEs.

Multiple computer networks, implemented in accordance with respective virtual topologies, may be instantiated on a single physical topology. As an example, multiple tenants may share a set of digital devices, which are arranged according to a physical topology. Each tenant may have a different desired arrangement of VTEs. Each arrangement of VTEs corresponds to a different virtual topology. Each virtual topology, of the respective tenants, may be instantiated on the physical topology.

In one or more embodiments, an instantiated element in a physical topology implements a tapping function, based on a request to tap a particular link in a virtual topology. A request to tap a link between a set of VTEs in a virtual topology is received. The link between the VTEs is mapped to a link between an instantiated source elements and an instantiated destination element in a physical topology. The source element and/or the destination element implements a tapping function. If the source element implements the tapping function, then the tapping function is applied to a set of data to be transmitted by the source element. Additionally, the source element forwards the set of data to the destination element. If the destination element implements the tapping function, then the tapping function is applied to a set of data received by the destination element. Additionally, the destination element forwards at least a portion of the set of data to another instantiated element in the physical topology.

In one or more embodiments, a tapping element in a physical topology implements a tapping function, based on a request to tap a particular link in a virtual topology. A request to tap a link between a set of VTEs in a virtual topology is received. The link between the VTEs is mapped to a link between an instantiated source elements and an instantiated destination element in a physical topology. A tapping element is instantiated on a path connecting the source element and the destination element. The tapping element receives a set of data transmitted by the source element and destined for the destination element. The tapping element applies a tapping function to the set of data. Additionally, the tapping element forwards the set of data to the destination element. The tapping element does not map to any VTEs in the virtual topology.

Applying a tapping function to a set of data includes: applying a tap filter to the set of data to extract at least a portion of the set of data; replicating the portion of the set of data; and transmitting the replicated data to a virtual endpoint. The replicated data may be referred to as the "tapped data." The virtual endpoint may be, for example, a virtual network interface. The virtual endpoint may provide the tapped data to a tap aggregator and/or other component within a tapping infrastructure.

One or more embodiments include aggregating and/or interleaving tapped data transmitted from multiple instantiated elements and/or tapping elements in a physical topology. A request to tap a link between a set of VTEs in a virtual topology is received. The link between the VTEs is mapped to multiple links between instantiated elements in a physical topology. An instantiated element, corresponding to each of the multiple links, implements a tapping function to obtain tapped data. Additionally and/or alternatively, a tapping element is instantiated on each of the multiple links between the instantiated elements. Each tapping element implements a tapping function to obtain tapped data. The tapped data from the multiple instantiated elements and/or tapping elements are transmitted to the same virtual endpoint. A tap aggregator and/or other component within a tapping infrastructure aggregates and/or interleaves the tapped data received at the virtual endpoint.

One or more embodiments described in this Specification and/or recited in the claims may not be included in this General Overview section.

2. Physical Topologies and Virtual Topologies

FIG. 1 illustrates relationships between a customer model 102, a virtual topology 104, and a physical topology 106, in accordance with one or more embodiments.

In one or more embodiments, a physical topology 106 includes a particular arrangement of digital devices of a computer network. Digital devices include function-specific hardware devices and/or generic machines. An example of a physical topology 106 is discussed below with reference to FIG. 3.

The term "digital device" generally refers to any hardware device that includes a processor. Examples of digital devices include a computer, a tablet, a laptop, a desktop, a netbook, a server, a web server, a network policy server, a proxy server, a generic machine, a hardware router, a hardware switch, a hardware firewall, a hardware firewall, a hardware network address translator (NAT), a hardware load balancer, a function-specific hardware device, a mainframe, a television, a content receiver, a set-top box, a printer, a mobile handset, a smartphone, and a personal digital assistant (PDA).

In an embodiment, the digital devices of a physical topology 106 form a computer network that provides connectivity between clients and network resources. Network resources include hardware and/or software configured to execute server processes. Examples of network resources include a processor, a data storage, a virtual machine, a container, and/or a software application. Network resources are shared amongst multiple clients. Such a computer network may be referred to as a "cloud network."

Additionally, the digital devices of a physical topology 106 form a computer network that is shared amongst multiple tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation. As an example, Best Bank may require that all emails pass through a particular firewall before entering a computer network that processes the data of Best Bank. State Security Agency may require that address translation be applied to all data entering a computer network that processes the data of State Security Agency. The same computer network may need to implement different network requirements demanded by different tenants. A multi-tenant computing network may also be an off-premise computer network, as the computer network may be implemented at a location that is away from the premises of the tenants served by the computer network.

Additional embodiments and/or examples relating to Computer Networks are described below in Section 5, titled "Computer Networks."

In one or more embodiments, a customer model 102 includes a particular arrangement of components of a computer network that is requested by a customer. The computer network may be an on-premise network of the customer and/or a private network of the customer. A customer model 102 may correspond to a computer network that is implemented by the customer and/or a customer's design of a computer network. A customer may request a particular customer model 102 in order to satisfy network requirements as well as security, performance, behavioral, and/or resiliency goals. As an example, a customer model may include (a) a primary server and (b) a backup server that duplicates the primary server. The backup server may replace the primary server in the event a failure occurs with the primary server. The customer model includes the duplicated servers to increase a level of resiliency of the computer network.

In an embodiment, a customer model 102 may include an arrangement of digital devices that is unnecessarily duplicative and/or inefficient. The inefficiencies may be a result of the constraints imposed by the physical nature of customer model 102. As an example, a physical design may include specification of each redundant paired component and corresponding interconnections. The physical design may specify that the redundant paired components are horizontally scaled according to a particular heuristic. The physical design may include specification of each scaled element and corresponding interconnections. The specification of redundant elements may give rise to inefficiencies.

In an embodiment, a customer may request implementation of a customer model 102 on a multi-tenant computer network. Implementation of the customer model 102 may include migrating a computer network already implemented by the customer onto the multi-tenant computer network. However, the customer model 102 may have no relationship to the physical topology 106 of the multi-tenant computer network. The customer model 102 and the physical topology 106 of the multi-tenant computer network may include different components and/or a different arrangement of the components. As explained in further detail below, the customer model 102 may be used to determine a virtual topology 104, which is used to instantiate various elements on a physical topology 106.

In one or more embodiments, a virtual topology 104 includes a particular arrangement of virtual topology entities (VTEs). Each VTE is associated with one or more functions. A VTE (which may be referred to as a "service VTE") may implement a function in order to satisfy network requirements and/or improve security, resiliency, and/or performance levels. Additionally or alternatively, a VTE (which may be referred to as a "host VTE") may implement a function to process and/or store data of a computer network. A host VTE may use the services provided by one or more service VTEs. Examples of functions performed by VTEs include but are not limited to the ability to:

(a) Routing and/or forwarding data to a next hop;
(b) Filtering and/or rejecting data based on a criterion;
(c) Inspecting data for security issues and/or other issues;
(d) Hiding and/or modifying a source address and/or destination address of data;
(e) Distributing data to resources based on availability of resources;
(f) Compressing data;
(g) Caching data;
(h) Storing data; and
(i) Processing data.

A VTE associated with a particular function may operate as a particular type of virtual component and/or physical component. Examples of VTEs include but are not limited to a gateway, a router, a switch, a hub, a proxy, a firewall, an intrusion detection system (IDS), a network address translator (NAT), a load balancer, and a network optimizer.

As an example, a VTE may filter data based on a set of security rules specified by a user (such as, a network administrator). The VTE may reject data based on the contents of the Internet Protocol (IP) and Transport headers of the data. The VTE may operate as an IP firewall. Other VTEs may filter data based on other characteristics of the data, such as the contents corresponding to the application layer of the data. These other VTEs may operate as firewalls of different types.

As another example, a VTE may monitor data for offline analysis of security anomalies. Offline analysis means that the analysis is performed after a decision to allow or reject data has already been made (this decision may be made by a firewall). Offline analysis allows the VTE to perform more complex inspection of the data than the firewall. The VTE may operate as an IDS.

As another example, a VTE may replace the source address and/or destination address of the data. The VTE may operate as a NAT. In some cases, multiple client devices within a particular Local Area Network (LAN) may share a single external or public IP address. The client devices may be assigned private IP addresses. A particular client device may transmit data to an external network outside of the LAN via a NAT. The source address of the data may be the private IP address of the particular client device. The NAT may replace the source address with the public IP address (used for outbound communication from all client devices in the LAN) prior to transmitting the data to the external network.

As another example, a VTE may serve as a single point of entry to multiple services. The VTE may forward service requests to a particular component based on the load of the components in the computer network. The VTE may operate as a load balancer.

As another example, a VTE may perform various functions to improve latency, bandwidth consumption, and/or other performance parameters of a computer network. The VTE may eliminate the transfer of redundant data. The VTE may perform compression and/or caching. The VTE may set an upper limit on the amount of data that may be transmitted by a particular client device over a particular time period. The VTE may operate as a network optimizer.

In one or more embodiments, a virtual topology specification 105 is a description of a virtual topology 104. A virtual topology specification 105 describes the functions of each VTE in a virtual topology 104. A virtual topology specification 105 may but does not necessarily include any reference to a physical topology 106 and/or digital devices therein. A virtual topology specification 105 may but does not necessarily specify which digital devices of a physical topology 106 perform which functions of which VTEs. The description of the particular arrangement of VTEs may be provided in various forms, such as graphic form 112 and/or code form 114.

A graphic form 112 of a virtual topology specification 105 may include a graph of the VTEs, such as the graph illustrated in FIG. 2, described below. A graphic form 112 may be specified by user input via a user interface. As an example, a user interface may include drag-and-drop functionality. A user may drag-and-drop a particular VTE to a particular location of a graph presented on the user interface. The user may connect the particular VTE to other VTEs already shown on the graph. The user may configure each VTE through the user interface. Based on the user input, the particular arrangement of the VTE in relation to the other VTEs already shown on the graph is specified.

A code form 114 of a virtual topology specification 105 may include lines of code, commands, or other textual descriptions of the particular arrangement of VTEs. As an example, a particular line of code may specify a name and/or function of a particular VTE. Another line of code may specify a particular arrangement of various VTEs. Code form 114 may be expressed in any computing language, such as XML (Extensible Markup Language), JSON (JavaScript Object Notation), YAML, Java, C++, C, C#, and Python.

In an embodiment, a virtual topology specification 105 includes a description of one or more forwarding policies. A forwarding policy specifies reachability between VTEs. The forwarding policy determines a next hop for a data packet based upon a destination prefix of the data packet and/or other metadata. Other metadata may include a port from which the data packet was received, or a hash value of a particular field of the data packet. The forwarding policy may be applied to Layer 3 transport protocols and/or Layer 2 transport protocols.

A forwarding policy may specify intermediate VTEs to be traversed between a particular VTE and a related VTE. As an example, there may be multiple paths between a source VTE and a destination VTE. One path may include the source VTE, VTE A, and the destination VTE. Another path may include the source VTE, VTE B, and the destination VTE. A forwarding policy may specify that for a data packet coming from the source VTE and destined for the destination VTE, the next hop is VTE A. Hence, a data packet would traverse the path including VTE A, instead of the path including VTE B.

A forwarding policy may specify filtering criteria for data packets transmitted between two VTEs. As an example, VTEs of a virtual topology may include two subnetworks. A forwarding policy may specify that data packets transmitted between the two subnetworks must first pass through a particular firewall. As another example, VTEs of a virtual topology may include two subnetworks. A forwarding policy may specify that data packets addressed to a particular address within one of the subnetworks must be dropped.

A forwarding policy applicable to a particular relationship corresponding to a particular VTE may also be applicable to another relationship corresponding to the particular VTE. The forwarding policy is applicable to the other relationship if the other relationship depends on the particular relationship.

As an example, a virtual topology may include a relationship between VTE A and VTE B (also referred to as the "VTE A-VTE B relationship"). The VTE A-VTE B relationship may include a forwarding policy requiring that data transmitted between VTE A and VTE B first pass through a firewall VTE. Additionally, the virtual topology may include a relationship between VTE B and VTE C (also referred to as the "VTE B-VTE C relationship"). The VTE B-VTE C relationship may include a forwarding policy that allows all data to be transmitted directly between VTE B and VTE C.

In this example, the VTE A-VTE B relationship and the VTE B-VTE C relationship provides reachability between VTE A and VTE C. VTE A may transmit data to VTE C by first transmitting the data to VTE B, which then forwards the data to VTE C. Hence, the relationship between VTE A and VTE C (also referred to as the "VTE A-VTE C relationship") depends on the VTE A-VTE B relationship.

Continuing this example, VTE A may transmit data to VTE C through VTE B. As the data is transmitted from VTE A to VTE B, the forwarding policy associated with the VTE A-VTE B relationship may be applied. Based on the forwarding policy, VTE A may transmit the data to the firewall VTE. If the data passes the filtering policy of the firewall VTE, then the firewall VTE may transmit the data to VTE B. VTE B may transmit the data to VTE C. In this example, the forwarding policy applicable to the VTE A-VTE B relationship is applicable to the VTE A-VTE C relationship. This example illustrates the transitive nature of forwarding policies with respect to the relationships corresponding to a VTE.

In an embodiment, a virtual topology 104 serves as an intermediary state between customer model 102 and physical topology 106. A virtual topology 104 may be a modified and/or simplified version of a customer model 102, while still satisfying the network requirements and/or goals of the customer model 102. In some cases, as described above, a customer model 102 may include various inefficiencies. As an example, a customer model may include redundant paired firewalls in a physical design. A virtual topology may include a single firewall. The single firewall is a VTE in the virtual topology. The virtual topology is specified with the assumption of resiliency. Resiliency is achieved by the nature of the virtual topology. If the VTE implementing the firewall functionality fails, then a new VTE configured to implement the firewall functionality is instantiated. In this example, the virtual topology describes a simplified version of the customer model, while maintaining the firewall functionality of the customer model.

Additionally, a virtual topology 104 may be instantiated on physical topology 106. During instantiation, VTEs of the virtual topology are mapped to digital devices of the physical topologies. A single VTE may be mapped to multiple digital devices. Conversely, multiple VTEs may be mapped to a single digital device. A particular digital device mapped to a particular VTE implements the functions corresponding to the particular VTE.

Multiple virtual topologies 104 may be instantiated by a single physical topology 106. As an example, multiple tenants may share a set of digital devices corresponding to a physical topology. Meanwhile, each tenant may desire a different arrangement of VTEs for implementing a computer network that satisfies the tenant's particular network requirements. A different virtual topology may be required for each tenant. The same set of digital devices may be used to instantiate the multiple different virtual topologies.

Additional embodiments and/or examples relating to instantiation of virtual topology 104 on physical topology 106 are described below with reference to FIGS. 4A-B.

2.1 An Example of a Virtual Topology

Figure 2:
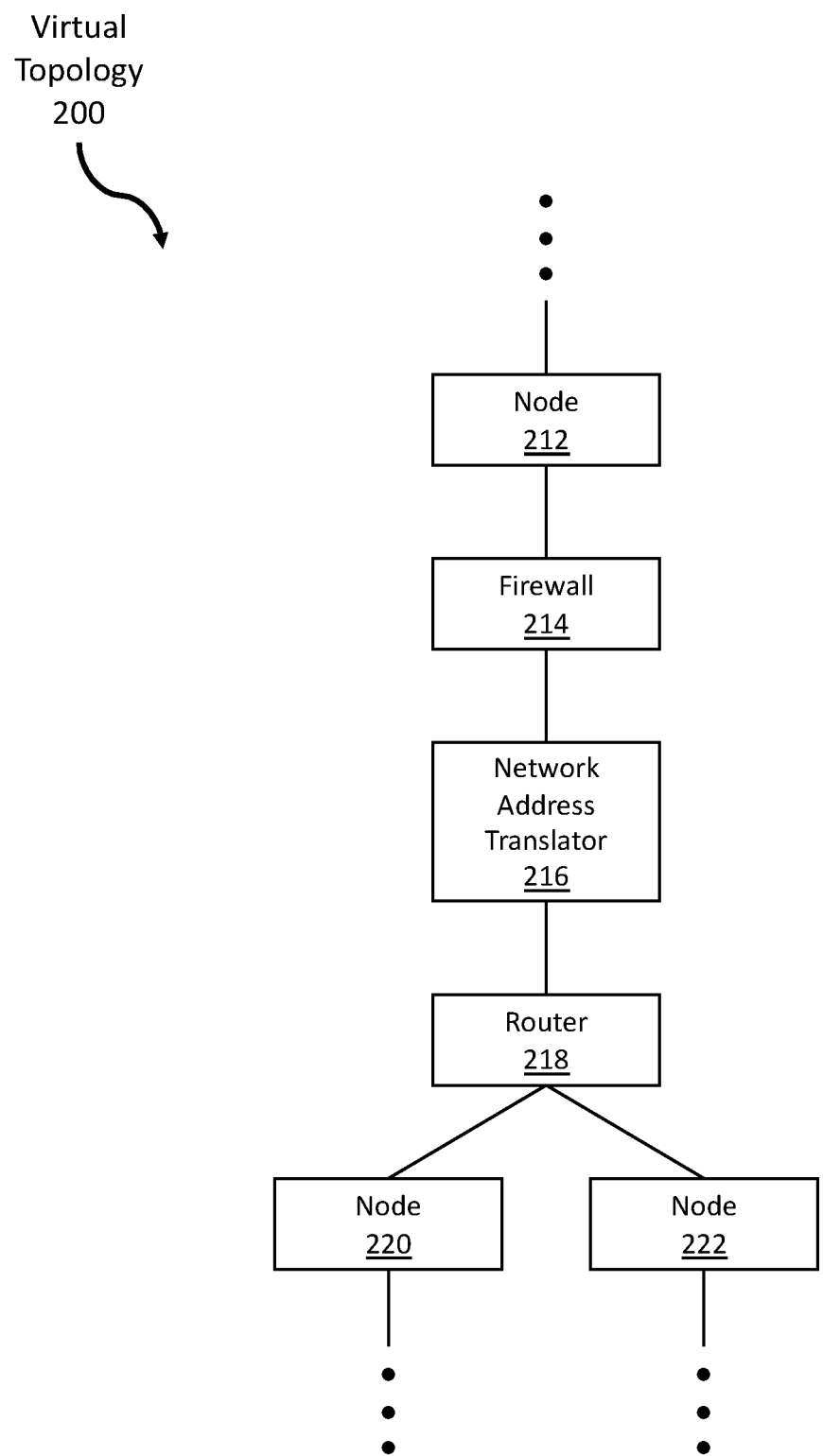
FIG. 2 illustrates an example of a virtual topology, in accordance with one or more embodiments.

FIG. 2 illustrates an example of a virtual topology, in accordance with one or more embodiments. As illustrated, a virtual topology 200 includes various VTEs, including node 212, firewall 214, network address translator (NAT) 216, router 218, node 220, and node 222. A virtual topology 200 may include more or fewer VTEs than the VTEs illustrated in FIG. 2. Each VTE is represented as a box. A connection between the VTEs is represented by a line.

In an embodiment, a virtual topology specification, describing the virtual topology 200, may be generated by a user submitting user input via a user interface. As an example, the user may be a representative of a customer (e.g., company with data being stored/processed by a cloud network), or a representative of a third party company implementing the computer network. The user may drag-and-drop a VTE to a particular location on a graph presented by the user interface. The user may label the VTE as "node 212." The user may drop-and-drop another VTE to another location on the graph. The user may label the VTE as "firewall 214." The user may add a line connecting node 212 and firewall 214. The user may further specify the functions performed by node 212 and firewall 214.

Example virtual topology 200 specifies how data is supposed to traverse through the VTEs. Data is supposed to traverse through the VTEs according to the connections linking the VTEs. As illustrated, for example, data may be transmitted from node 212 to node 220 by traversing through firewall 214, NAT 216, and router 218. At firewall 214, the data may be processed to perform a firewall functionality associated with firewall 214. Based on the firewall functionality, the data may be inspected to determine whether to allow the data to pass through. Additionally, at NAT 216, the data may be processed to perform a NAT functionality associated with NAT 216. Based on the NAT functionality, the source address and/or destination address of the data may be modified. Additionally, at router 218, the data may be processed to perform the routing functionality of router 218. Based on the routing functionality, the next hop of the data may be identified as node 220. Router 218 may forward the data to node 220.

2.2 An Example of a Physical Topology

Figure 3:
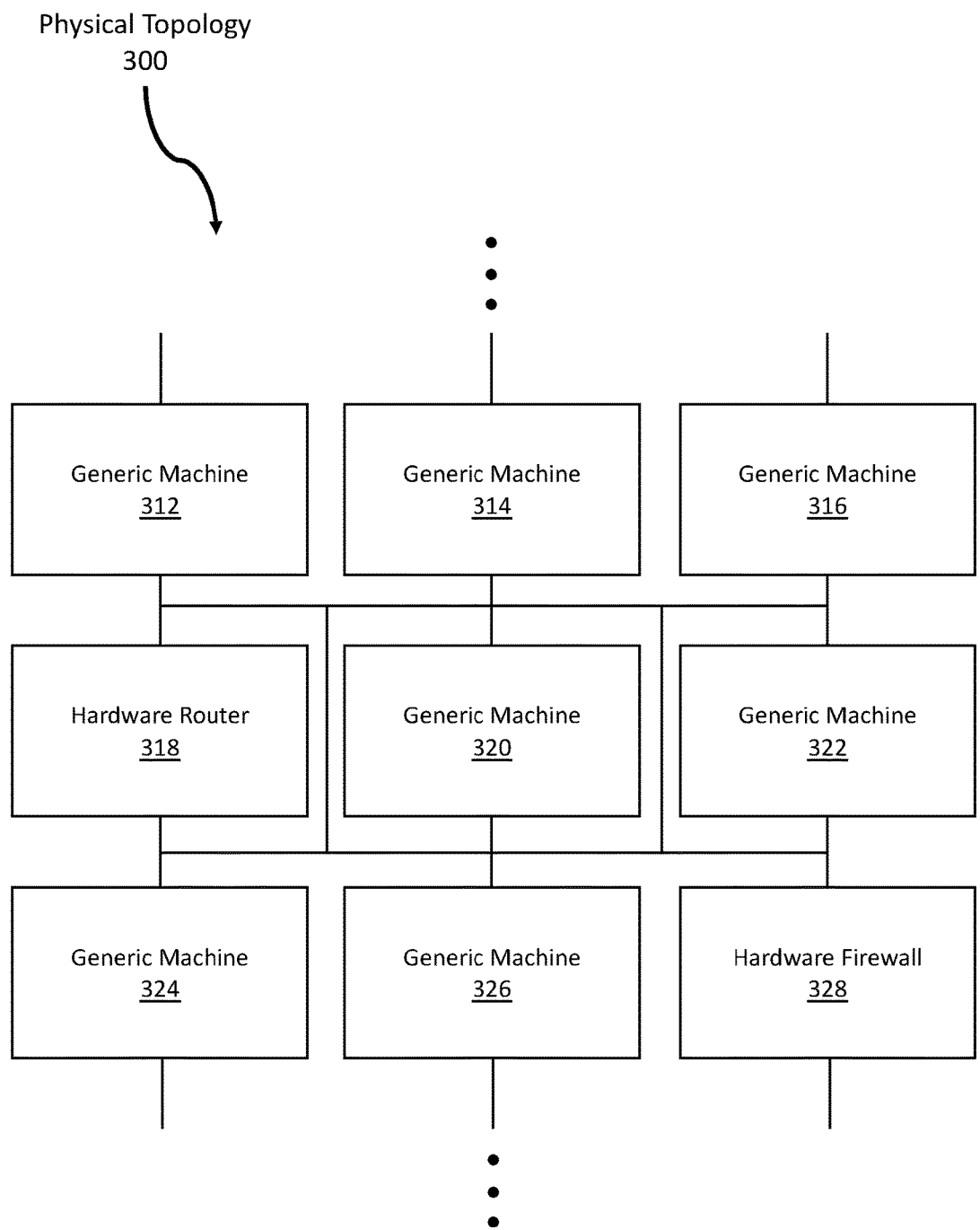
FIG. 3 illustrates an example of a physical topology, in accordance with one or more embodiments.

FIG. 3 illustrates an example of a physical topology, in accordance with one or more embodiments. As illustrated, physical topology 300 includes various digital devices, including generic machines 312-316 and 320-326, hardware router 318, and hardware firewall 328. Physical topology 300 may include more or fewer digital devices than the digital devices illustrated in FIG. 3. Each digital device is represented as a box. Each digital device may be connected to any number of one or more other digital devices within physical topology 300. The digital devices may be located in a single geographical location or distributed across various geographical locations.

In an embodiment, physical topology 300 may correspond to a cloud network. The digital devices shown in physical topology 300 may be shared amongst multiple client devices and/or tenants. A particular digital device may perform a same function for different client devices and/or tenants. A particular digital device may perform different functions for different client devices and/or tenants.

2.3 Instantiation of a Virtual Topology on a Physical Topology

There may be multiple ways to instantiate the same virtual topology on a physical topology. Instantiation of a virtual topology on a physical topology 300 includes mapping VTEs in a virtual topology to digital devices of the physical topology 300.

VTEs in a virtual topology may be executed in an overlay network. A VTE is associated with both a middlebox and a gateway. The middlebox is configured to implement the function of the VTE. The gateway is configured to transmit and/or receive data via the overlay network.

The overlay network is implemented on top of an underlay network corresponding to the physical topology. Each VTE is associated with two addresses: (a) an overlay address corresponding to the VTE and (b) an underlay address corresponding to the digital device on which the VTE is instantiated. The addresses may be fixed (for example, entered by a network administrator). Additionally or alternatively, the addresses may be dynamically assigned (for example, by a Dynamic Host Configuration Protocol (DHCP) and/or another application). Data is transmitted between VTEs in a virtual topology by tunneling through the underlying network. Tunneling is further described below with reference to FIG. 4A.

Figure 4A:
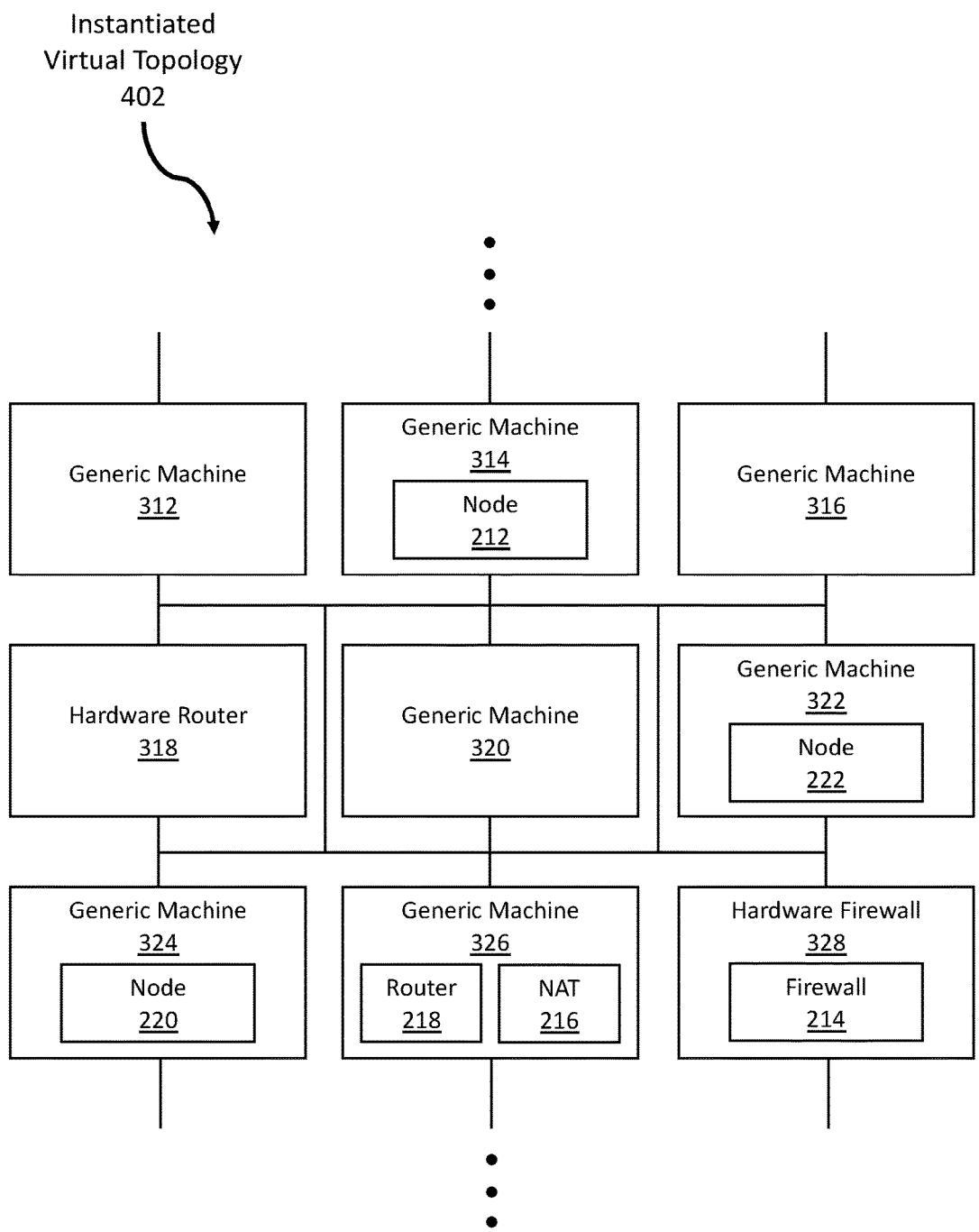
FIGS. 4A-B illustrate examples of an instantiated virtual topology, in accordance with one or more embodiments.
Figure 4B:
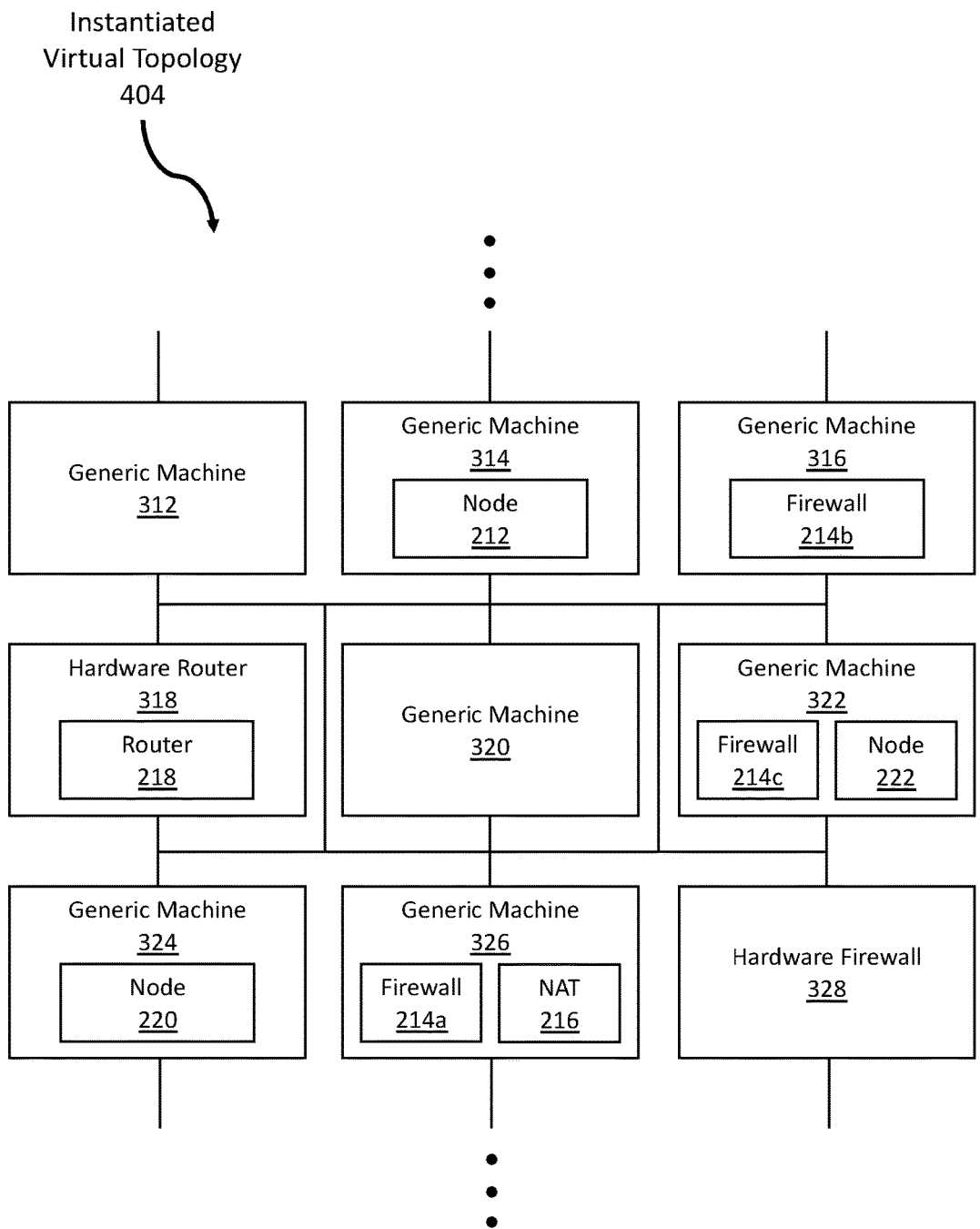

FIG. 4A illustrates an example of an instantiated virtual topology 402. The instantiated virtual topology 402 is based on the virtual topology 200 (illustrated in FIG. 2) and the physical topology 300 (illustrated in FIG. 3). An element of FIG. 4A that is labeled with a same number as a particular element of FIG. 2 or 3 corresponds to the particular element of FIG. 2 or 3.

A generic machine of physical topology 300 executing a virtual machine and/or software application may instantiate a VTE of a virtual topology 200. As illustrated, generic machine 314 instantiates node 212. Generic machine 324 instantiates node 220.

Additionally, a function-specific hardware device of physical topology 300 may instantiate a VTE of a virtual topology 200. As illustrated, hardware firewall 328 instantiates firewall 214.

A single digital device of physical topology 204 may instantiate multiple VTEs of a virtual topology 200. The digital device may instantiate multiple VTEs using multiple virtual machines, containers, and/or software applications. Alternatively, the digital device may instantiate multiple VTEs using a single virtual machine and/or software application. As illustrated, generic machine 326 instantiates both router 218 and NAT 216. Router 218 and NAT 216 may be executed by separate virtual machines and/or software application executing on generic machine 326. Alternatively, router 218 and NAT 216 may be executed by a same virtual machine and/or software application executing on generic machine 326.

The following is an example of the traversal of components in the transmission of data from node 212 to either node 220 or node 222. Initially, node 212 of generic machine 314 transmits the data to firewall 214, implemented by hardware firewall 328. Firewall 214 transmits the data to NAT 216 of generic machine 326. NAT 216 transmits the data to router 218 of generic machine 326. Based on a determination made by router 218, router 218 transmits the data to either node 220 of generic machine 324 or node 222 of generic machine 322.

As data is transmitted between VTEs, the data is tunneled through the underlying network corresponding to the physical topology 300. Each VTE is associated with an encapsulation-decapsulation network interface card (also referred to herein as an "encap-decap NIC"). An encap-decap NIC includes encapsulation mappings for VTEs in the virtual topology. An encapsulation mapping for a VTE includes (a) an overlay address corresponding to a VTE and (b) an underlay address that may be used to transmit data via the underlying network to the overlay address. The underlay address may be an address of a digital device that instantiates the VTE. Alternatively, the underlay address may be a next hop for forwarding data towards the VTE.

Referring to the illustrated example, node 212 generates data addressed to node 220 using the overlay address of node 220. An encap-decap NIC associated with node 212 receives the data. The encap-decap NIC determines that the data is addressed to the overlay address of node 220. The encap-decap NIC determines the underlay address of the next hop for forwarding the data towards node 220, which is the underlay address associated with firewall 214. The underlay address associated with firewall 214 is the underlay address of hardware firewall 328. The encap-decap NIC encapsulates the data using the underlay address associated with firewall 214. The encap-decap NIC transmits the encapsulated data to firewall 214.

An encap-decap NIC associated with firewall 214 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with NAT 216. The underlay address associated with NAT 216 is the underlay address of generic machine 326. The encap-decap NIC encapsulates the data using the underlay address associated with NAT 216. The encap-decap NIC transmits the encapsulated data to NAT 216.

An encap-decap NIC associated with NAT 216 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with router 218. The underlay address associated with router 218 is the underlay address of generic machine 326. The encap-decap NIC encapsulates the data using the underlay address associated with router 218. The encap-decap NIC transmits the encapsulated data to router 218.

An encap-decap NIC associated with router 218 receives and decapsulates the encapsulated data. The encap-decap NIC determines that the data is addressed to the overlay address of node 220. The encap-decap NIC determines the underlay address of the next hop for forwarding the data towards node 220, which is the underlay address associated with node 220. The underlay address associated with node 220 is the underlay address of generic machine 324. The encap-decap NIC encapsulates the data using the underlay address associated with node 220. The encap-decap NIC transmits the encapsulated data to node 220.

In alternative embodiments, when data is transmitted from NAT 216 to router 218, generic machine 326 (and/or a component thereof) may determine that both NAT 216 and router 218 are implemented by generic machine 326. Hence, when the NAT 216 transmits data to the router 218, the data is not encapsulated. The NAT 216 transmits the data directly to the router 218. When the router 218 transmits the data to the next hop (which is implemented by a different machine of the physical topology 300), then the data is encapsulated for transmission through the underlay network.

As described above, there may be multiple ways to instantiate the same virtual topology on a physical topology. FIG. 4B illustrates another example of an instantiated virtual topology 404. The instantiated virtual topology 404 is based on the virtual topology 200 (illustrated in FIG. 2) and the physical topology 300 (illustrated in FIG. 3). An element of FIG. 4B that is labeled with a same number as a particular element of FIG. 2 or 3 corresponds to the particular element of FIG. 2 or 3.

As illustrated, generic machine 314 instantiates node 212. Generic machine 316 instantiates firewall 214b. Hardware router 318 instantiates router 218. Generic machine 322 instantiates firewall 214c and node 222. Generic machine 324 instantiates node 220. Generic machine 326 instantiates firewall 214a and NAT 216.

Multiple digital devices of physical topology 300 may instantiate a single VTE of virtual topology 200. As illustrated, generic machines 326, 316, and 322 together instantiate firewall 214 of virtual topology 200. In this example, firewall 214 is distributed to multiple digital devices. Each of firewall 214a, 214b, and 214c is a distributed element of firewall 214.

Data being processed by the computer network does not necessarily traverse all of the distributed elements of a single VTE. Data being processed by the computer network does not necessarily traverse various VTEs in a same order as indicated in the virtual topology 200. The following is an example of the traversal of components in the transmission of data from node 212 to node 220 or node 222. Initially, node 212 of generic machine 314 transmits the data to firewall 214a of generic machine 326. Firewall 214a transmits the data to NAT 216 of generic machine 326. NAT 216 transmits the data to hardware router 318. Based on a determination made by hardware router 318, hardware router 318 transmits the data to either firewall 214b of generic machine 316 or firewall 214c of generic machine 322. Firewall 214b transmits the data to node 220 of generic machine 324. Alternatively, firewall 214c transmits the data to node 222 of generic machine 322.

As illustrated in this example, the traversal of NAT 216 and hardware router 318 occurs between (a) the traversal of firewall 214a and (b) the traversal of firewall 214b. Alternatively, the traversal of NAT 216 and hardware router 318 occurs between (a) the traversal of firewall 214a and (b) the traversal of firewall 214c. Hence, the actual communication path taken by the data is different than the communication path indicated in the virtual topology 200.

Further, as illustrated in this example, data that is destined for node 220 traverses firewall 214a and firewall 214b, without traversing through firewall 214c. Alternatively, data that is destined for node 222 traverses firewall 214a and firewall 214c, without traversing through firewall 214b. Hence, the data does not necessarily traverse through all distributed elements (firewall 214a-c) of a single VTE.

Distribution of a single VTE across multiple digital devices may be performed for various reasons, such as increase performance, efficiency, and/or resilience of a computer network. As an example, a virtual topology 200 may specify the following functions for firewall 214:

(a) Reject data that has a source IP address of Address X;
(b) If the destination of the data is node 220, reject data that includes Data Y;
(c) If the destination of the data is node 222, reject data that includes Data Z.

Functions (b) and (c) are only executed for a subset of data that traverses firewall 214. Specifically, function (b) is executed only for data addressed to node 220. Function (c) is executed only for data addressed to node 222.

If firewall 214 is not distributed to multiple digital devices, then the single digital device that instantiates firewall 214 needs to perform all of functions (a), (b), and (c) on any data that traverses firewall 214. Firewall 214 needs to determine whether any data has a source IP address of Address X. Firewall 214 needs to determine whether the data is addressed to node 220, and if yes, whether the data includes Data Y. Firewall 214 needs to determine whether the data is addressed to node 222, and if yes, whether the data includes Data Z.

In contrast to the above example, distributing firewall 214 to multiple digital devices would require firewall 214a of generic machine 326 to only perform function (a) on a set of data that traverses firewall 214a. Thereafter, firewall 214a transmits the set of data to NAT 216 of generic machine 326. NAT 216 transmits the set of data to hardware router 318. Hardware router 318 routes a subset of data, addressed to node 220, to node 220. Hardware router 318 routes a subset of data, addressed to node 222, to node 222. As an inherent part of the routing functionality, hardware router 318 identifies the data for which function (b) is applicable (that is, data addressed to node 220). Hardware router 318 also identifies the data for which function (c) is applicable (that is, data addressed to node 222). Based on the determination made by hardware router 318, hardware router 318 transmits a subset of data to either firewall 214b or firewall 214c. Firewall 214b need only perform function (b) for the subset of data routed to firewall 214b. Firewall 214c need only perform function (c) for the subset of data routed to firewall 214c. Hence, firewalls 214a, 214b, and 214c operate in a distributed manner to increase performance and/or efficiency of the computer network.

As another example, NAT 216 of the virtual topology 200 may be instantiated as distributed elements on a physical topology. One instantiated NAT may not have sufficient capacity to handle the network traffic. Hence, multiple instances of NAT 216 are instantiated on the physical topology for load balancing and efficiency purposes. Each instance of NAT 216, on the physical topology, may be referred to as a "distributed element." Each instance of NAT 216 performs the same function as that specified for NAT 216 by the virtual topology 200.

The way that a virtual topology is instantiated on a physical topology may vary based on changes in the physical topology. As an example, a particular machine in a physical topology may instantiate a particular VTE. Over time, the particular machine may fail. A different machine in the physical topology may instantiate the particular VTE. As another example, a particular machine in a physical topology may instantiate a particular VTE. Over time, the network traffic may increase. An additional machine in the physical topology may also instantiate the particular VTE. Hence, the particular VTE becomes two distributed elements in the physical topology.

During instantiation, a set of mappings between the VTEs and the instantiated elements are stored in a data repository. Responsive to any changes in the virtual topology and/or the physical topology, changes to the set of mappings between the VTEs and the instantiated elements are updated in the data repository.

3. Virtual Tapping System

Figure 5:
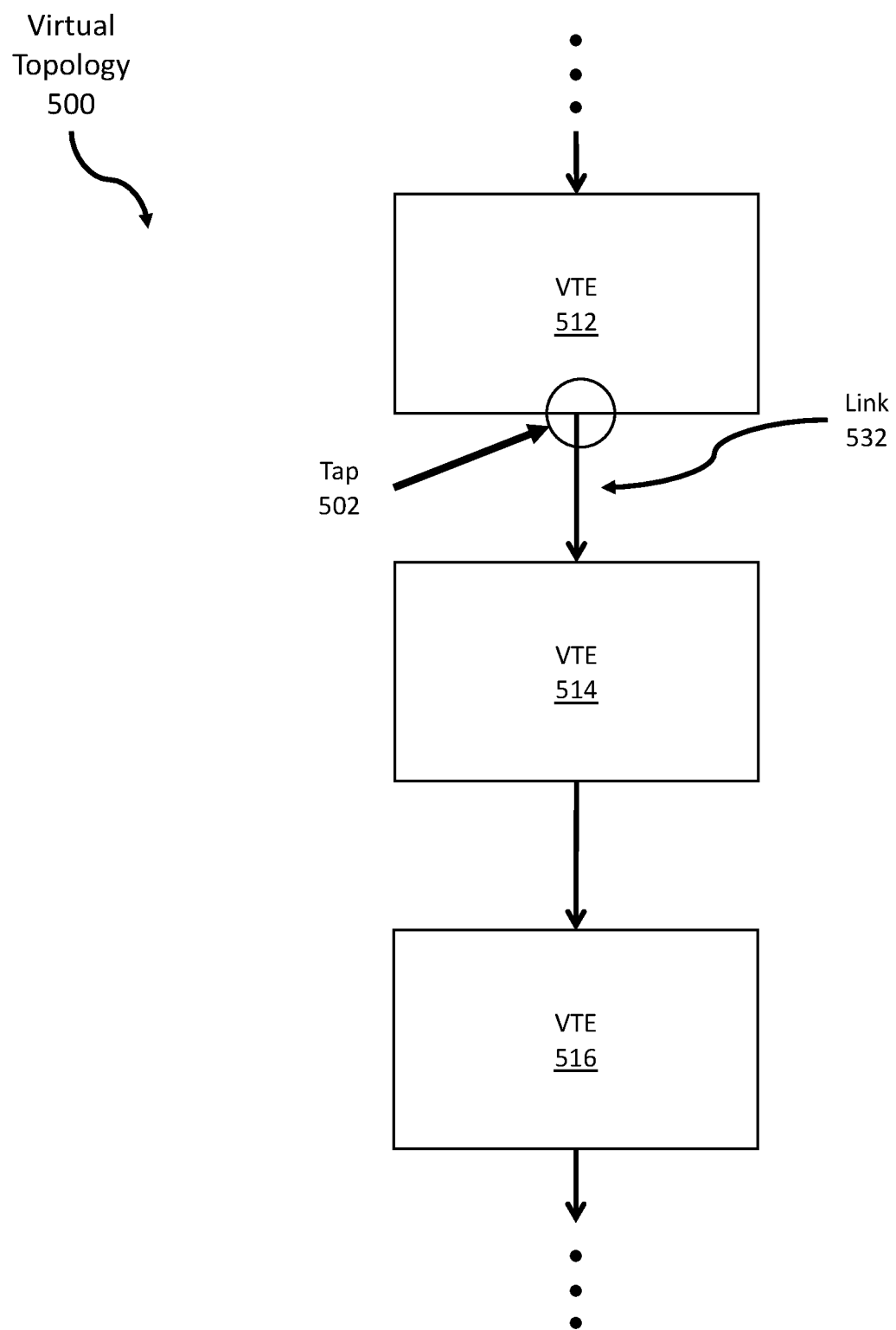
FIG. 5 illustrates an example of a request to tap a link in a virtual topology, in accordance with one or more embodiments.

FIG. 5 illustrates an example of a request to tap a link in a virtual topology, in accordance with one or more embodiments. As illustrated, a virtual topology 500 includes VTEs 512-516. A link 532 connects VTE 512 and VTE 514. VTE 512 is configured to transmit data to VTE 514. VTE 512 may be referred to a "source VTE" corresponding to the link 532. VTE 514 may be referred to as a "destination VTE" corresponding to the link 532. In one or more embodiments, the virtual topology 500 may include more or fewer VTEs than the VTEs illustrated in FIG. 5.

In an example, a user may request to tap the link 532. The request is illustrated as tap 502. The request may specify tapping an output of VTE 512 connecting to the link 532. Alternatively, the request may identify the link 532 for tapping, without specifying whether to tap VTE 512 and/or VTE 514.

Figure 6A:
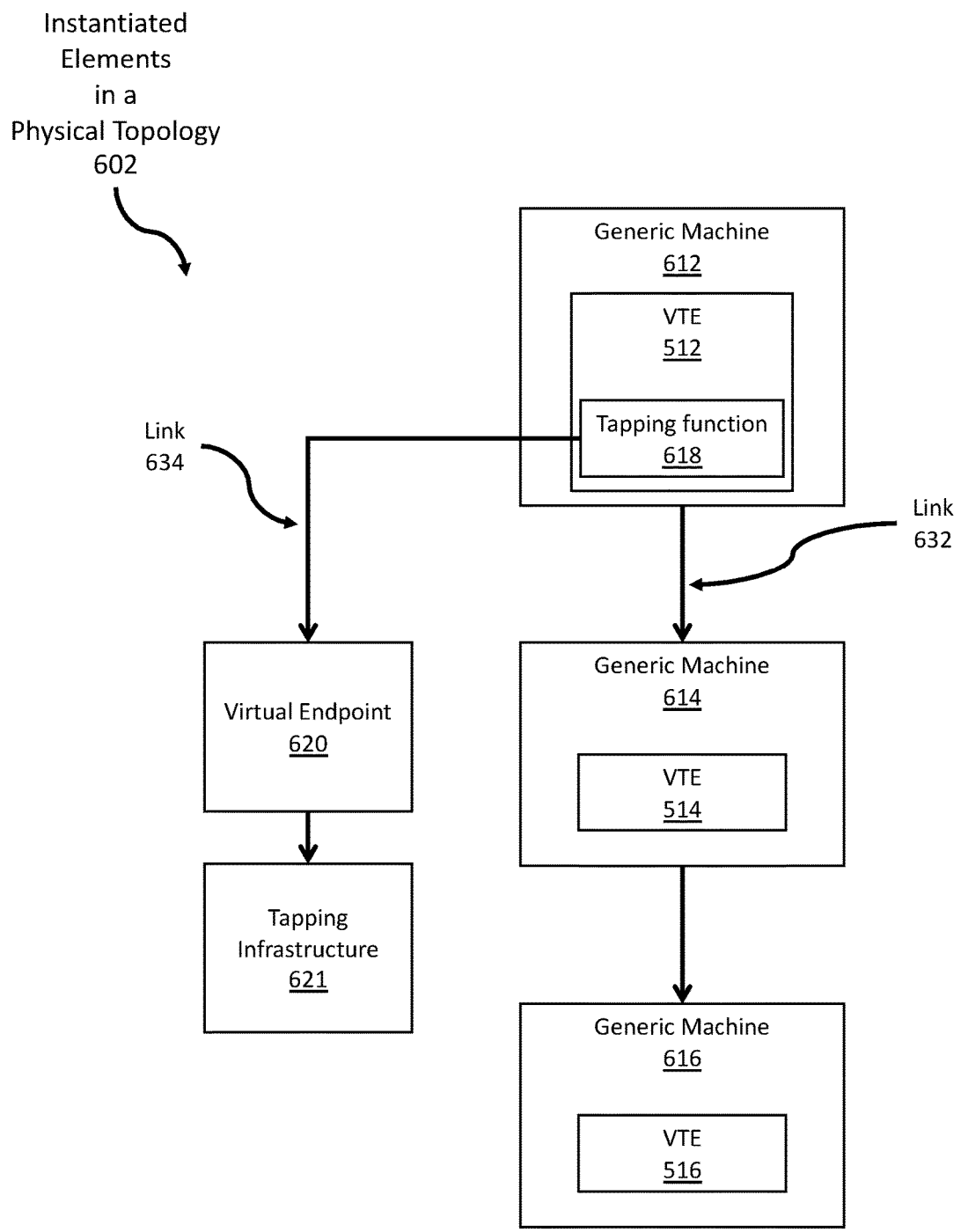
FIGS. 6A-B illustrate examples of implementing a tapping function by an instantiated element in a physical topology, in accordance with one or more embodiments.
Figure 6B:
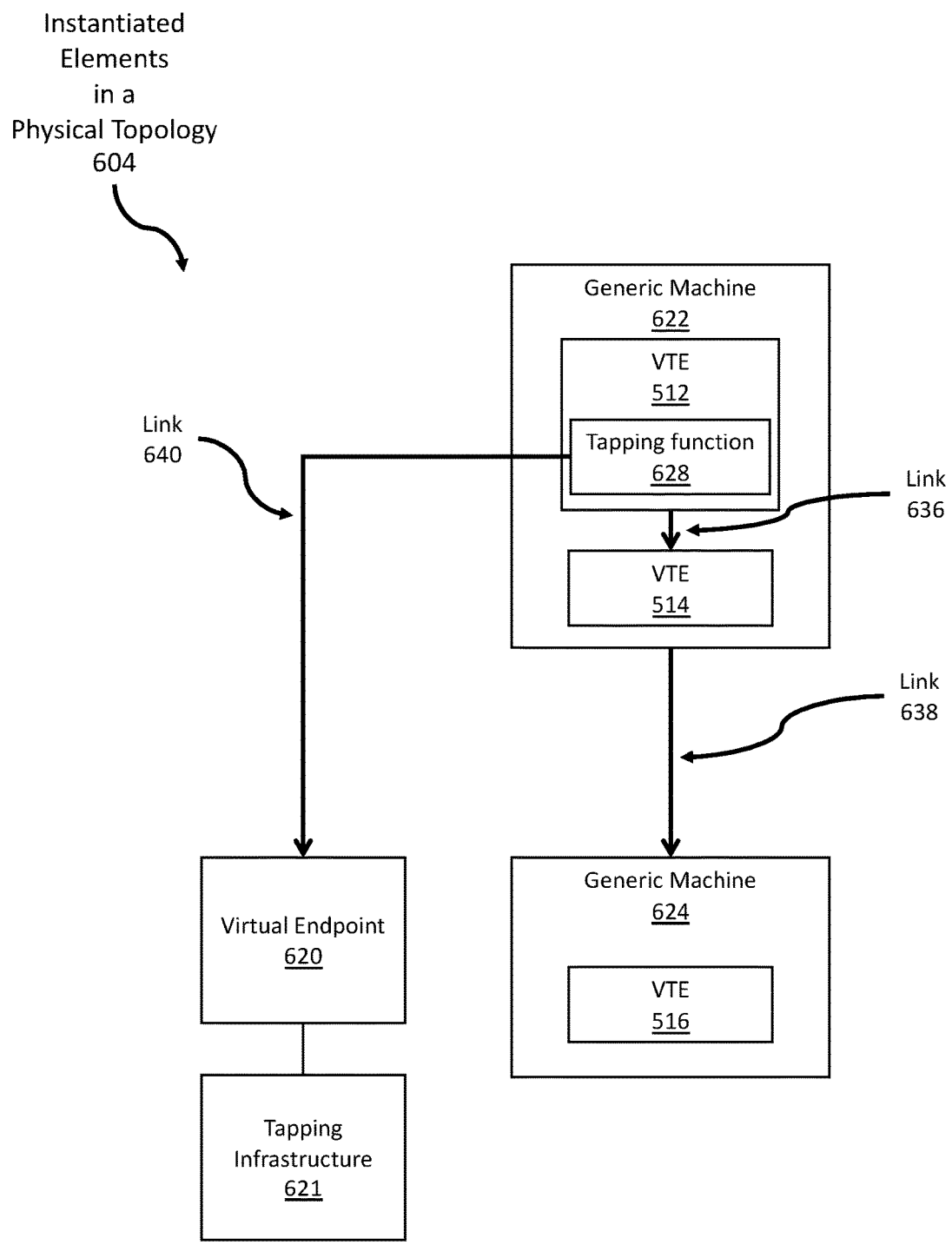

FIGS. 6A-B illustrate examples of implementing a tapping function by an instantiated element in a physical topology, based on the request to tap the link 532 in the virtual topology 500 (illustrated in FIG. 5). As described above, there may be multiple ways to instantiate the same virtual topology on a physical topology. FIG. 6A illustrates one set of instantiated elements 602 in a physical topology, based on the virtual topology 500. FIG. 6B illustrates a different set of instantiated elements 604 in a physical topology, based on the virtual topology 500. Elements that are labeled with the same number across FIG. 5, FIG. 6A, and/or FIG. 6B refer to the same element.

As illustrated in FIG. 6A, generic machine 612 instantiates VTE 512. Generic machine 614 instantiates VTE 514. Generic machine 616 instantiates VTE 516.

As described above, a user may request to tap the link 532 of the virtual topology 500. The link 532 is mapped to the link 632. If the user's request specifies tapping an output of VTE 512, then the source element (that is, the instantiated VTE 512), corresponding to the link 632, implements a tapping function 618. Alternatively, if the user's request does not specify whether to tap VTE 512 and/or VTE 514, then the source element (that is, the instantiated VTE 512) and/or the destination element (that is, the instantiated VTE 514), corresponding to the link 632, may implement a tapping function 618. As illustrated in this example, the instantiated VTE 512 is selected to implement the tapping function 618.

The instantiated VTE 512 applies the tapping function 618 to a set of data to be transmitted by the instantiated VTE 512. The tapping function 618 includes: applying a tap filter to the set of data to extract at least a portion of the set of data; replicating the portion of the set of data; and transmitting the replicated data to a virtual endpoint 620. The replicated data may be referred to as "tapped data." The virtual endpoint 620 transmits the tapped data to a tapping infrastructure 621. Examples of operations for implementing a tapping function are described below with reference to FIGS. 10 and 12.

The tapping function 618 does not modify any network data between transmitted between the instantiated elements in the physical topology. The instantiated VTE 512 processes data according to the functions specified for VTE 512 in the virtual topology 500. The instantiated VTE 512 identifies any processed data that is destined for the instantiated VTE 514. The instantiated VTE 512 transmits the data to the instantiated VTE 514.

Hence, based on (a) the tapping function 618 and (b) the function of VTE 512 as specified in the virtual topology 500, the instantiated VTE 512 transmits two sets of data. One set of data, transmitted on the link 632, is network data that has been processed by the instantiated VTE 512 and is destined for the instantiated VTE 514. Another set of data, transmitted on the link 634, is the tapped data that is replicated from at least a portion of the network data.

In an embodiment, a tapping infrastructure 621 includes one or more components configured to process, store, and/or transmit tapped data. One component in a tapping infrastructure 621 may be, for example, a tap aggregator. A tap aggregator is configured to aggregate tapped data obtained via tapping functions implemented on multiple instantiated elements. The tap aggregator outputs one stream of data that includes the tapped data from the multiple instantiated elements.

As an example, a user may request to tap a particular link between a source VTE and a destination VTE in a virtual topology. The particular link may be mapped to multiple links between a set of instantiated elements in a physical topology. Multiple instantiated elements may each implement a tapping function. The tapped data, from the multiple instantiated elements, may be transmitted to a tap aggregator. The tap aggregator may aggregate the tapped data obtained from the multiple instantiated elements.

As another example, a user may request to tap data transmitted in both directions on a particular link between VTEs in a virtual topology. The particular link is mapped to a link between a first instantiated element and a second instantiated element in a physical topology. The first instantiated element may apply a tapping function to data to be transmitted by the first instantiated element and destined for the second instantiated element. Additionally, the second instantiated element may apply a tapping function to data to be transmitted by the second instantiated element and destined for the first instantiated element. The tapped data, from the first and second instantiated elements, may be transmitted to a tap aggregator. The tap aggregator may aggregate (a) tapped data obtained based on data transmitted in a particular direction on the link and (b) tapped data obtained based on data transmitted in the opposite direction on the link.

Another component in a tapping infrastructure may be, for example, a user interface engine. The user interface engine is configured to receive and/or present information at a user. The user interface engine receives a request to tap a particular link in a virtual topology. Additionally or alternatively, the user interface engine presents individual and/or aggregated tapped data associated with the particular link in the virtual topology.

In an embodiment, a virtual endpoint 620 is a connection between (a) an instantiated element implementing a tapping function 618 and (b) a tapping infrastructure 621. The instantiated element implementing the tapping function 618 and the tapping infrastructure 621 may operate in the same overlay network or different overlay networks.

As an example, VTE 512, VTE 514, and VTE 516, which are instantiated in the physical topology, may communicate via a particular overlay network (referred to herein as the "virtual topology overlay network"). Components within the tapping infrastructure 621 may communicate via a different overlay network (referred to herein as the "tapping overlay network"). A virtual endpoint 620 may connect to VTE 512 and the tapping infrastructure 621. The virtual endpoint 620 may be configured to transmit data between the two overlay networks. The virtual endpoint 620 receives data from VTE 512 including a particular encapsulation header corresponding to the virtual topology overlay network. The virtual endpoint 620 removes the particular encapsulation header, and adds a new encapsulation header corresponding to the tapping overlay network. Based on the new encapsulation header, the virtual endpoint 620 transmits the data to a component in the tapping infrastructure 621.

In an embodiment, a virtual endpoint 620 allows the transmission of data only in one direction. The virtual endpoint 620 transmits data from an instantiated element implementing a tapping function 618 to a tapping infrastructure 621. However, the virtual endpoint 620 does not permit transmission of data from the tapping infrastructure 621 to the instantiated element. The restriction on the transmission of data prevents the tapping infrastructure 621 from interfering with network data being transmitted between the instantiated elements in the physical topology.

Referring to FIG. 6B, generic machine 622 instantiates VTE 512 and VTE 514. Generic machine 624 instantiates VTE 516. The instantiated VTE 512 may transmit data to the instantiated VTE 514 via an overlay network. Alternatively, the instantiated VTE 512 may transmit data directly to the instantiated VTE 514, without tunneling through the overlay network. Alternatively, a single virtual machine, container, and/or application may instantiate both VTE 512 and VTE 514 on generic machine 622. The instantiated VTE 512 may transmit data to the instantiated VTE 514 within the same virtual machine, container, and/or application.

As described above, a user may request to tap the link 532 of the virtual topology 500. The link 532 is mapped to the link 636. If the user's request specifies tapping an output of VTE 512, then the source element (that is, the instantiated VTE 512), corresponding to the link 636, implements a tapping function 628. Alternatively, if the user's request does not specify whether to tap VTE 512 and/or VTE 514, then the source element (that is, the instantiated VTE 512) and/or the destination element (that is, the instantiated VTE 514), corresponding to the link 636, may implement a tapping function 628. As illustrated in this example, the instantiated VTE 512 is selected to implement the tapping function 628.

The instantiated VTE 512 applies the tapping function 628 to a set of data to be transmitted by the instantiated VTE 512. The tapping function 628 is similar to the tapping function 618, as described above. Examples of operations for implementing a tapping function are described below with reference to FIGS. 10 and 12.

The tapping function 628 does not modify any network data between transmitted between the instantiated elements in the physical topology. The instantiated VTE 512 processes data according to the functions specified for VTE 512 in the virtual topology 500. The instantiated VTE 512 identifies any processed data that is destined for the instantiated VTE 514. The instantiated VTE 512 transmits the data to the instantiated VTE 514.

Similarly, the instantiated VTE 514 processes data according to the functions specified for VTE 514 in the virtual topology 500. The instantiated VTE 514 identifies any processed data that is destined for the instantiated VTE 516. The instantiated VTE 514 transmits the data to the instantiated VTE 516.

Hence, as described above, based on (a) the tapping function 628 and (b) the function of VTE 512 as specified in the virtual topology 500, the instantiated VTE 512 transmits two sets of data. One set of data is transmitted on the link 636, and another set of data is transmitted on the link 640.

Additionally, viewing the computer network from the perspective of the physical topology, the generic machine 622 transmits two sets of data. One set of data is transmitted on the link 638, and another set of data is transmitted on the link 640.

The set of data transmitted on the link 638 is the data that passes a tap filter applied by the tapping function 628. The set of data transmitted on the link 640 is the data that passes any filter that is part of the function of VTE 514 as specified in the virtual topology 500. As an example, the virtual topology 500 may specify that VTE 514 applies a firewall filter. In this scenario, the set of data transmitted on the link 640 is the data that passes the firewall filter. The set of data transmitted on the link 638 may be referred to as "tapped data." The set of data transmitted on the link 640 may be referred to as "network data."

The set of data transmitted on the link 638 and the set of data transmitted on the link 640 may but do not necessarily overlap. As an example, the instantiated VTE 512 may apply a tap filter, as part of the tapping function 628, that filters out all data associated with a priority flag. Hence, data without a priority flag is transmitted onto the link 640. The instantiated VTE 514 may apply a firewall filter, as specified in the virtual topology 500, that filters out all data without a priority flag. Hence, data with a priority flag is transmitted onto the link 638. In this example, there is no overlap between (a) the set of data transmitted on the link 638 and (b) the set of data transmitted on the link 640. In this example, generic machine 622 transmits two completely different sets of data.

Figure 7:
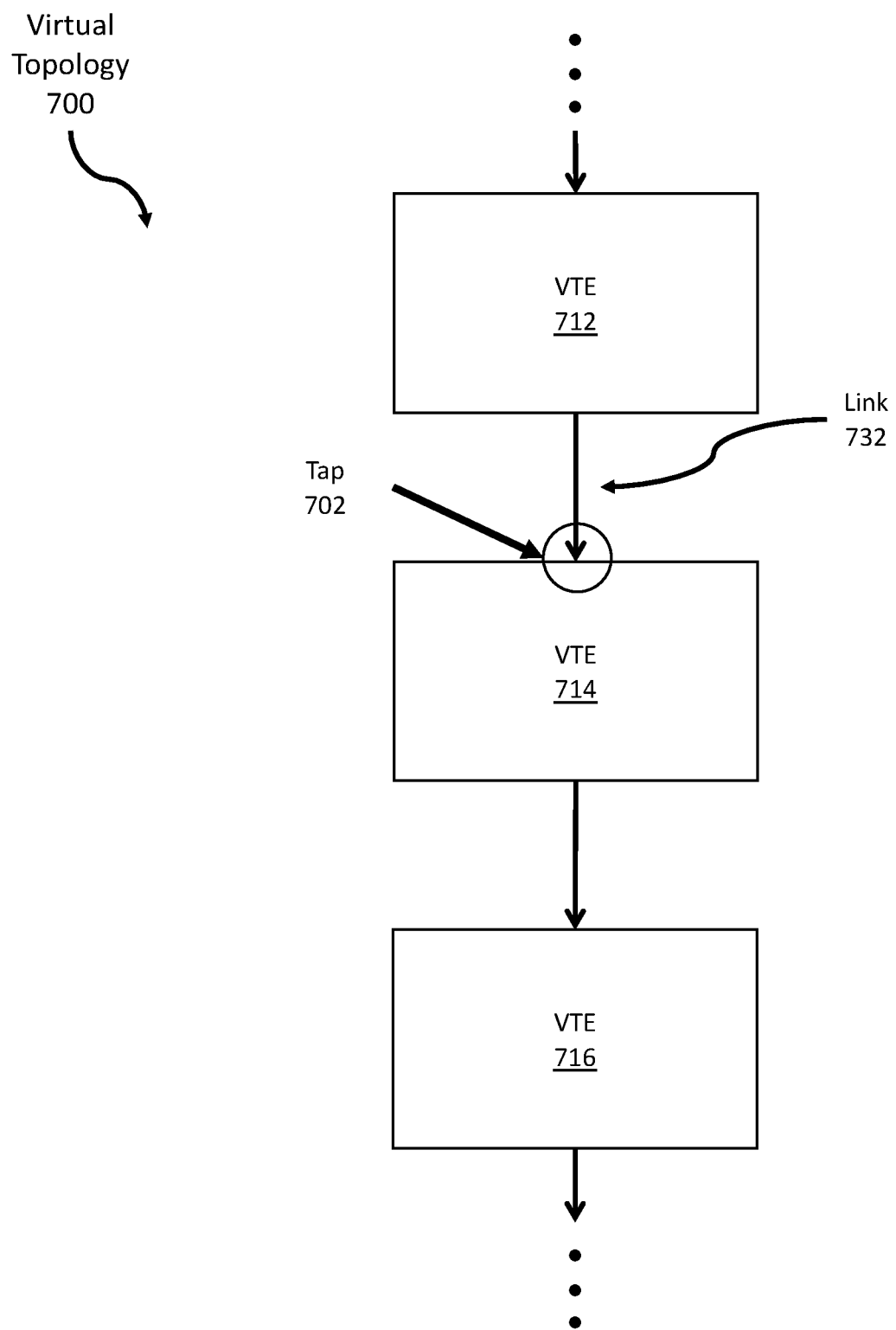
FIG. 7 illustrates another example of a request to tap a link in a virtual topology, in accordance with one or more embodiments.

FIG. 7 illustrates another example of a request to tap a link in a virtual topology, in accordance with one or more embodiments. As illustrated, a virtual topology 700 includes VTEs 712-716. A link 732 connects VTE 712 and VTE 714. VTE 712 is configured to transmit data to VTE 714. VTE 712 may be referred to a "source VTE" corresponding to the link 732. VTE 714 may be referred to as a "destination VTE" corresponding to the link 732. In one or more embodiments, the virtual topology 700 may include more or fewer VTEs than the VTEs illustrated in FIG. 7.

In an example, a user may request to tap the link 732. The request is illustrated as tap 702. The request may specify tapping an input of VTE 714 connecting to the link 732. Alternatively, the request may identify the link 732 for tapping, without specifying whether to tap VTE 712 and/or VTE 714.

Figure 8:
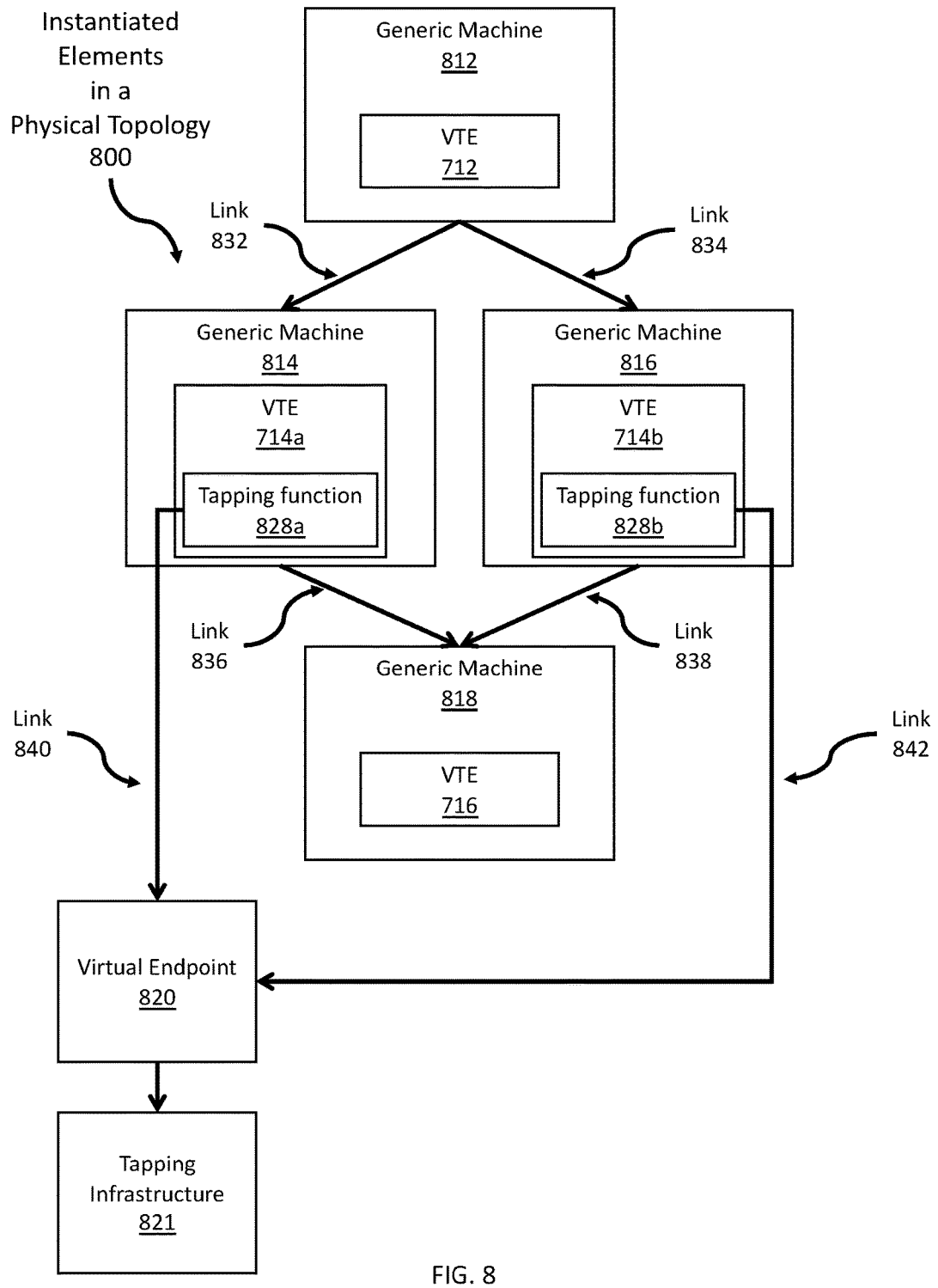
FIG. 8 illustrates an example of implementing tapping functions by distributed instantiated elements in a physical topology, in accordance with one or more embodiments.

FIG. 8 illustrates an example of implementing tapping functions by distributed instantiated elements in a physical topology, based on the request to tap the link 732 in the virtual topology 700 (illustrated in FIG. 7). Elements that are labeled with the same number across FIG. 7 and FIG. 8 refer to the same element.

FIG. 8 illustrates a set of instantiated elements 800 in a physical topology, based on the virtual topology 700. Generic machine 812 instantiates VTE 712. Generic machine 814 instantiates VTE 714a. Generic machine 816 instantiates VTE 714b. Generic machine 818 instantiates VTE 716. VTE 714, of the virtual topology 700, is instantiated as distributed elements, VTE 714a and VTE 714b. VTE 714 may be instantiated as distributed elements for load balancing and efficiency purposes. A single instantiated VTE 714a may not have sufficient capacity to process all the network traffic destined for VTE 714. With the instantiation of the distributed elements, each of VTE 714a and VTE 714b is responsible for processing a portion of the network traffic. Each of VTE 714a and VTE 714b may have sufficient capacity to process a portion of the network traffic.

As described above, a user may request to tap the link 732 of the virtual topology 700. The link 732 is mapped to links 832-834. If the user's request specifies tapping an input of VTE 714, then the destination element (that is, the instantiated VTE 714a), corresponding to the link 832, implements a tapping function 828a. The destination element (that is, the instantiated VTE 714b), corresponding to the link 834, implements a tapping function 828b. Alternatively, if the user's request does not specify whether to tap VTE 712 and/or VTE 714, then the source element (that is, the instantiated VTE 712) and/or the destination elements (that is, the instantiated VTE 714a and VTE 714b), corresponding to the links 832-834, may implement a tapping function 828a-b. As illustrated in this example, the instantiated VTE 714a and VTE 714b are selected to implement the tapping function 828a and tapping function 828b, respectively. Hence, a request to tap one link 732 between VTEs in the virtual topology 700 corresponds to tapping multiple links 832-834 between instantiated elements in the physical topology.

The instantiated VTE 712 determines which portion of the network data to transmit to the instantiated VTE 714a, and which portion of the network data to transmit to the instantiated VTE 714b. The instantiated VTE 714a applies the tapping function 828a to the set of data received by the instantiated VTE 714a. The instantiated VTE 714b applies the tapping function 828b to the set of data received by the instantiated VTE 714b. The tapping functions 828a-b are similar to the tapping function 618, as described above. Based on the tapping functions 828a-b, the instantiated VTE 714a and VTE 714b transmit tapped data to a virtual endpoint 820. The virtual endpoint 820 transmits the tapped data to a tapping infrastructure 821. The virtual endpoint 820 is similar to the virtual endpoint 620, as described above. The tapping infrastructure 821 is similar to the tapping infrastructure 621, as described above. A tap aggregator may aggregate the tapped data from the instantiated VTE 714a and VTE 714b to obtain information regarding the link 732, which is being tapped. Examples of operations for implementing a tapping function are described below with reference to FIGS. 10 and 12.

The tapping functions 828a-b do not modify any network data between transmitted between the instantiated elements in the physical topology. The instantiated VTE 714a processes data according to the functions specified for VTE 714 in the virtual topology 700. The instantiated VTE 714a identifies any processed data that is destined for the instantiated VTE 716. The instantiated VTE 714a transmits the data to the instantiated VTE 716.

Similarly, the instantiated VTE 714b processes data according to the functions specified for VTE 714 in the virtual topology 700. The instantiated VTE 714b identifies any processed data that is destined for the instantiated VTE 716. The instantiated VTE 714b transmits the data to the instantiated VTE 716.

Hence, as described above, based on (a) the tapping function 828a and (b) the function of VTE 714 as specified in the virtual topology 700, the instantiated VTE 714a transmits two sets of data. One set of data is transmitted on the link 836, and another set of data is transmitted on the link 840.

Further, based on (a) the tapping function 828b and (b) the function of VTE 714 as specified in the virtual topology 700, the instantiated VTE 714b transmits two sets of data. One set of data is transmitted on the link 838, and another set of data is transmitted on the link 842.

Figure 9:
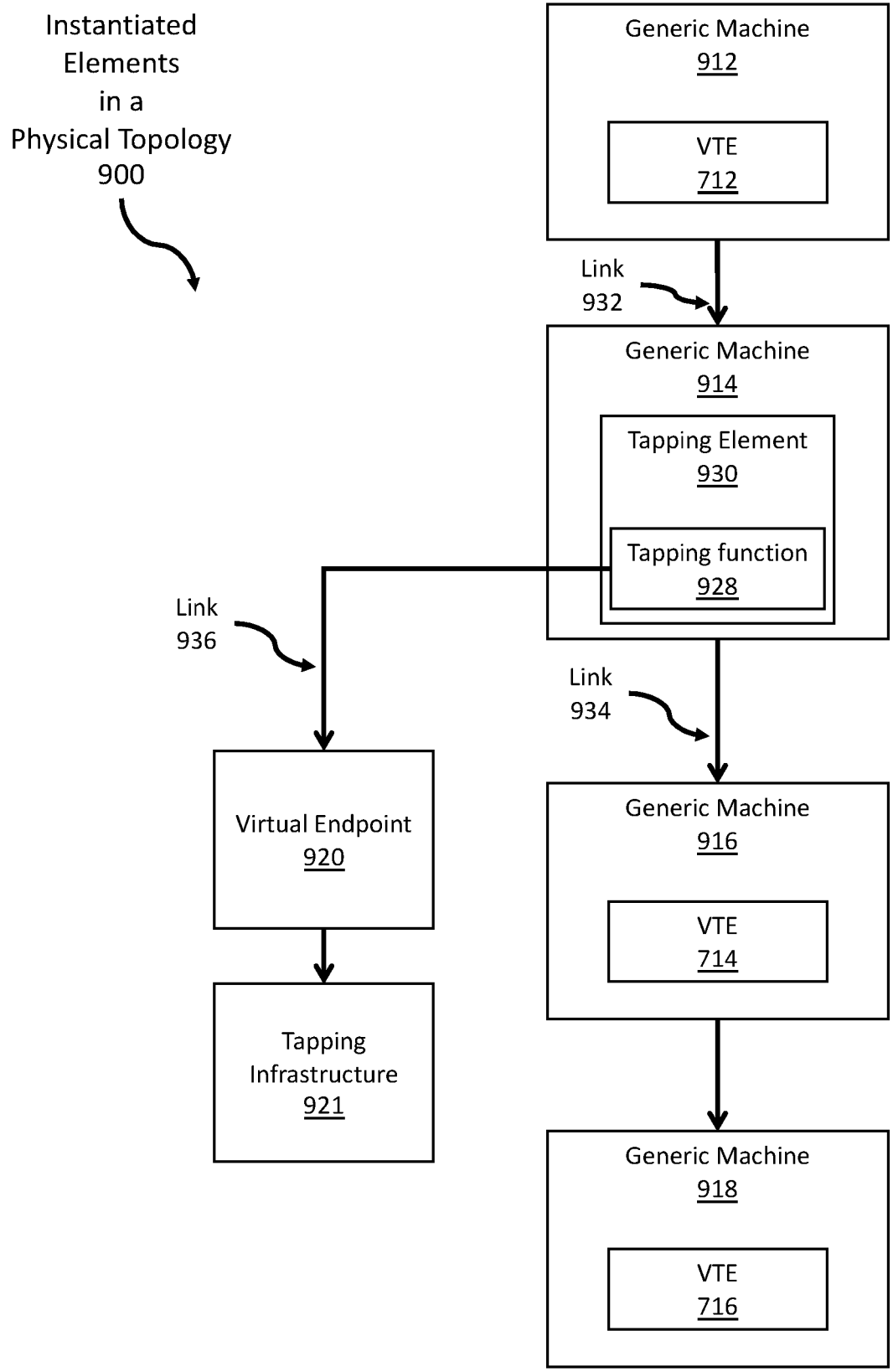
FIG. 9 illustrates an example of implementing a tapping function by a tapping element in a physical topology, in accordance with one or more embodiments.

FIG. 9 illustrates an example of implementing a tapping function by a tapping element in a physical topology, based on the request to tap the link 732 in the virtual topology 700 (illustrated in FIG. 7). Elements that are labeled with the same number across FIG. 7 and FIG. 9 refer to the same element.

FIG. 9 illustrates a set of instantiated elements 900 in a physical topology, based on the virtual topology 700.

Generic machine 912 instantiates VTE 712. Generic machine 916 instantiates VTE 714. Generic machine 918 instantiates VTE 716.

As described above, a user may request to tap the link 732 of the virtual topology 700. The link 732 is mapped to a link that connects the instantiated VTE 712 and the instantiated VTE 714. A tapping element 930 is instantiated on the link that connects the instantiated VTE 712 and the instantiated VTE 714. Hence, as illustrated, the link 932 connects the instantiated VTE 712 and the tapping element 930. The link 934 connects the tapping element 930 and the instantiated VTE 714.

As illustrated, the tapping element 930 is instantiated on a generic machine 914 that is different than the generic machines instantiating VTE 712 and VTE 714. In other embodiments, the tapping element 930 may be instantiated on the same generic machine that instantiates VTE 712 and/or VTE 714.

The tapping element 930 does not correspond to any VTEs included in the virtual topology 700. The tapping element 930 is instantiated in response to the request to tap a link in the virtual topology 700.

The tapping element 930 receives a set of data from the instantiated VTE 712. The set of data from the instantiated VTE 712 is destined for the instantiated VTE 714. However, based on the request to tap the link 732, the data destined for the instantiated VTE 714 is routed to the tapping element 930.

The tapping element 930 applies the tapping function 928 to the set of data received by the tapping element 930. The tapping function 928 is similar to the tapping function 618, as described above. Based on the tapping function 928, the tapping element 930 transmits tapped data to a virtual endpoint 920. The virtual endpoint 920 transmits the tapped data to a tapping infrastructure 921. The virtual endpoint 920 is similar to the virtual endpoint 620, as described above. The tapping infrastructure 921 is similar to the tapping infrastructure 621, as described above. Examples of operations for implementing a tapping function are described below with reference to FIGS. 11 and 12.

The tapping function 928 does not modify any network data between transmitted between the instantiated elements in the physical topology. The instantiated VTE 712 processes data according to the functions specified for VTE 712 in the virtual topology 700. The instantiated VTE 712 identifies any processed data that is destined for the instantiated VTE 714. The instantiated VTE 712 transmits the data to the tapping element 930. The tapping element 930 forwards the data to the instantiated VTE 714.

Hence, the tapping element 930 transmits two sets of data. One set of data, transmitted on the link 934, is network data that has been processed by the instantiated VTE 712 and is destined for the instantiated VTE 714. Another set of data, transmitted on the link 936, is the tapped data that is replicated from at least a portion of the network data.

4. Implementing a Virtual Tap in a Virtual Topology

One or more embodiments include implementing one or more virtual taps in a virtual topology. A virtual tap is a request to tap a particular link between a set of VTEs in a virtual topology. Based on the virtual tap, one or more instantiated elements implement one or more tapping functions, as further described below with reference to FIG. 10. Additionally or alternatively, one or more tapping elements implement one or more tapping functions, as further described below with reference to FIG. 11. Details regarding the tapping function are described below with reference to FIG. 12.

In an embodiment, virtual taps may be requested at both (a) an output of a VTE corresponding to a particular link and (b) an input of another VTE corresponding to the particular link. A comparison of the tapped data obtained from each virtual tap may be used to determine what data, if any, is being dropped via the particular link.

In an embodiment, virtual taps may be requested at both (a) an input of a particular VTE and (b) an output of the particular VTE. A comparison of the tapped data obtain from each virtual tap may be used to determine what data, if any, is being dropped via the particular VTE.

In an embodiment, a virtual tap may be requested at an output of a source VTE, while a security policy blocks communication between the source VTE and the destination VTE. The security policy may be implemented as a filter applied at the source VTE. Hence, no data is transmitted on the physical topology between the source VTE and the destination VTE. However, the virtual tap on the output of the source VTE may be used to monitor the dropped traffic that was destined for the destination VTE.

A. Implementing a Tapping Function by an Instantiated Element

Figure 10:
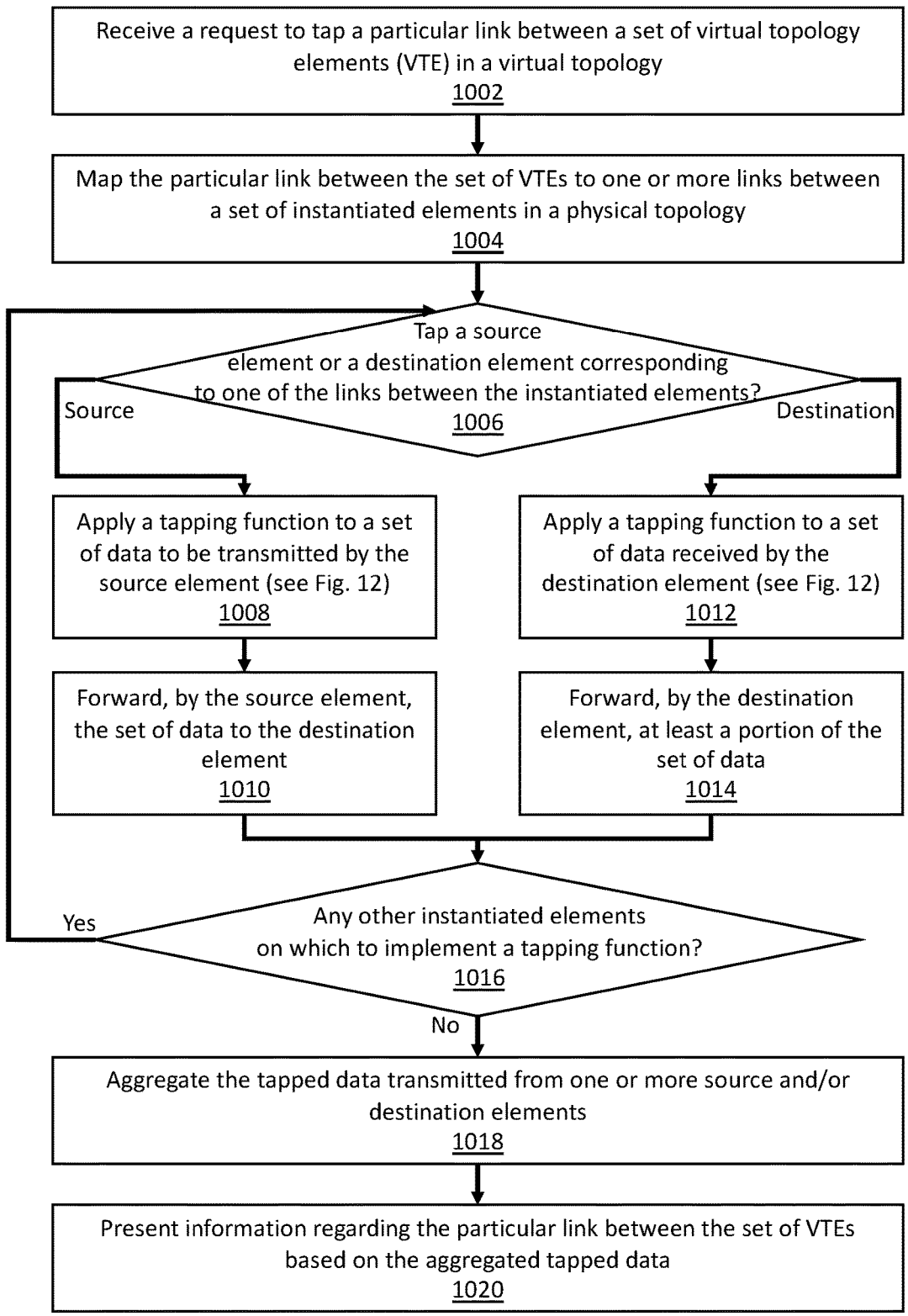
FIG. 10 illustrates an example set of operations for implementing tapping functions by one or more instantiated elements in a physical topology, in accordance with one or more embodiments.

FIG. 10 illustrates an example set of operations for implementing tapping functions by one or more instantiated elements in a physical topology, in accordance with one or more embodiments. One or more operations illustrated in FIG. 10 may be modified, rearranged, or omitted all together. Accordingly, the particular sequence of operations illustrated in FIG. 10 should not be construed as limiting the scope of one or more embodiments.

One or more embodiments include receiving a request to tap a particular link between a set of virtual topology elements (VTE) in a virtual topology (Operation 1002). The request may be received via a user interface and/or from another application.

As an example, a user interface may present a graphical representation of a virtual topology. The graphical representation may show a set of VTEs and links between the VTEs. A user may select, via the user interface, one of the links between the VTEs. The user may request to tap the selected link.

One or more embodiments include mapping the particular link between the set of VTEs to one or more links between a set of instantiated elements in a physical topology (Operation 1004). As described above, a set of mappings between the VTEs and the instantiated elements are maintained in a data repository. A subset of the set of mappings that correspond to the VTEs identified in the tap request are determined. Based on the subset of mappings, the instantiated elements corresponding to the VTEs are determined. The links between the instantiated elements are also determined.

Referring to FIGS. 7 and 8 as an example, a user may request to tap a link 732 between VTEs 712-714 in the virtual topology 700. Based on a set of mappings between VTEs and instantiated elements maintained in a data repository, the link 732 is mapped to links 832-834 between instantiated elements in the physical topology.

One or more embodiments include determining whether to tap a source element and/or a destination element corresponding to one of the links between the instantiated elements (Operation 1006). If the tap request specifies tapping an output of a VTE onto the particular link, then a source element corresponding to a link between the instantiated elements is selected for tapping. Alternatively, if the tap request specifies tapping an input of a VTE from the particular link, then a destination element corresponding to a link between the instantiated elements is selected for tapping. Alternatively, if the tap request does not specify whether to tap an output or an input of a VTE, then a source element and/or a destination element may be tapped. Whether to tap the source element or the destination element may be determined based on a load of the source element, a load of the destination element, and/or other factors.

Referring to FIGS. 5 and 6A as an example, a user may request to tap a link 532 between VTEs 512-514 in the virtual topology 500. The link 532 is mapped to the link 632 between instantiated elements in the physical topology. The instantiated VTE 512 serves as the source element corresponding to the link 632. The instantiated VTE 514 serves as the destination element corresponding to the link 632. If the tap request does not specify whether to tap VTE 512 or VTE 514, then the instantiated VTE 512 and/or the instantiated VTE 514 may be selected to implement a tapping function. As illustrated in the example, the instantiated VTE 512 implements the tapping function 618.

If the source element is tapped, then one or more embodiments include applying a tapping function to a set of data to be transmitted by the source element (Operation 1008). As described above with reference to Operation 1002, a request to tap a particular link between a set of VTEs is received. The source element instantiates a particular VTE that is identified in the tap request. The source element implements at least a portion of the functions of the particular VTE, as specified in the virtual topology. The source element receives data that is destined for the destination element. The source element applies the functions of the particular VTE onto the data. Based on the application of the functions of the particular VTE onto the data, the source element determines a set of data to be transmitted by the source element.

As an example, a source element may implement a firewall function specified by a virtual topology. Application of the firewall function may filter out all video data. The source element may apply the firewall function to data received by the source element. Based on the firewall function, the source element may determine a set of data to be transmitted by the source element. The set of data to be transmitted by the source element does not include any video data.

As another example, a source element may implement a NAT function specified by a virtual topology. Application of the NAT function may result in a set of translated addresses. The source element may apply the NAT function to a particular address received by the source element. Based on the NAT function, the source function may determine a translated address to be transmitted by the source element.

The source element applies the tapping function to the set of data to be transmitted by the source element. A middlebox and/or a gateway associated with the source element may implement the tapping function. Based on the tapping function, the source element transmits tapped data to a virtual endpoint. Examples of operations for applying the tapping function to a set of data are described below with reference to FIG. 12.

One or more embodiments include forwarding, by the source element, the set of data to the destination element (Operation 1010). As described above, the source element implements functions of a particular VTE, as specified in the virtual topology. Based on the application of the functions, the source element determines a set of data to be transmitted by the source element to the destination element. The source element transmits the set of data to the destination element.

Referring to FIGS. 5 and 6 as an example, a user may request to tap a link 532 between VTEs 512-514 in the virtual topology 500. The link 532 maps to the link 632 between instantiated elements in a physical topology. The instantiated VTE 512 serves as the source element corresponding to the link 632. The instantiated VTE 514 serves as the destination element corresponding to the link 632. Based on functions of VTE 512 as specified in the virtual topology 500, the instantiated VTE 512 determines a set of data to be transmitted by the instantiated VTE 512. The instantiated VTE 512 applies the tapping function 618 on the set of data. Additionally, the instantiated VTE 512 forwards the set of data to the instantiated VTE 514.

The tapping function does not modify any network data being transmitted between the instantiated elements. Regardless of whether the source element implements the tapping function, the source element transmits the same set of data to the destination element.

In an alternative embodiment, Operations 1008 and 1010 may be implemented differently. The source element applies the tapping function to the set of data to be transmitted by the source element, as described above with reference to Operation 1008. However, a security policy blocks communication between (a) the particular VTE that is identified in the tap request and (b) the destination VTE that is connected to the particular VTE. A filter is applied at the particular VTE to block the communication to the destination VTE. Hence, in the physical topology, the source element instantiating the particular VTE does not forward the set of data to the destination element. In this embodiment, the set of data is replicated as a result of the tapping function applied at Operation 1008. But the set of data is not forwarded to the destination element as a result of the security policy. The tapping function is applied to data that is being dropped due to the security policy.

If the destination element is tapped, then one or more embodiments include applying a tapping function to a set of data received by the destination element (Operation 1012). The destination element receives a set of data from the source element. The destination applies the tapping function to the set of data received by the destination element. A middlebox and/or a gateway associated with the destination element may implement the tapping function. Based on the tapping function, the destination element transmits tapped data to a virtual endpoint. Examples of operations for applying the tapping function to a set of data are described below with reference to FIG. 12.

One or more embodiments include forwarding, by the destination element, at least a portion of the set of data (Operation 1014). As described above with reference to Operation 1002, a request to tap a particular link between a set of VTEs is received. The destination element instantiates a particular VTE that is identified in the tap request. The destination element implements at least a portion of the functions of the particular VTE, as specified in the virtual topology. The destination element applies the functions of the particular VTE onto the set of data received from the source element. Based on the application of the functions of the particular VTE onto the data, the destination element determines at least a portion of the set of data to be transmitted by the destination element to another instantiated element in the physical topology. The destination element transmits the portion of the set of data to the other instantiated element.

As an example, a destination element may implement a firewall function specified by a virtual topology. Application of the firewall function may filter out all video data. The destination element may apply the firewall function to a set of data received from the source element. Based on the firewall function, the destination element may determine a portion of the set of data to be transmitted by the destination element. The portion of data to be transmitted by the destination element does not include any video data. The destination element may transmit the portion of data to another instantiated element in the physical topology.

Referring to FIGS. 7 and 8 as an example, a user may request to tap a link 732 between VTEs 712-714 in the virtual topology 700. The link 732 maps to the link 832 between instantiated elements in a physical topology. The instantiated VTE 712 serves as the source element corresponding to the link 832. The instantiated VTE 714a serves as the destination element corresponding to the link 832. The instantiated VTE 714a applies the tapping function 828a on a set of data received by the instantiated VTE 714a. Additionally, based on functions of VTE 714 as specified in the virtual topology 700, the instantiated VTE 714a determines at least a subset of the set of data to be transmitted by the instantiated VTE 714a. The instantiated VTE 714a forwards the subset of data to the instantiated VTE 716.

Additionally, the link 732 maps to the link 834 between instantiated elements in a physical topology. The instantiated VTE 712 serves as the source element corresponding to the link 832. The instantiated VTE 714b serves as the destination element corresponding to the link 832. The instantiated VTE 714b applies the tapping function 828b on a set of data received by the instantiated VTE 714b. Additionally, based on functions of VTE 714 as specified in the virtual topology 700, the instantiated VTE 714b determines at least a subset of the set of data to be transmitted by the instantiated VTE 714b. The instantiated VTE 714b forwards the subset of data to the instantiated VTE 716.

The tapping function does not modify any network data being transmitted between the instantiated elements. Regardless of whether the destination element implements the tapping function, the destination element transmits the same portion of data to the other instantiated element in the physical topology.

One or more embodiments include determining whether to implement a tapping function on any other instantiated elements in the physical topology (Operation 1016). As described above with reference to Operation 1004, the particular link, identified in the tap request, is mapped to one or more links between instantiated elements. In order to obtain a complete set of tapped data for the particular link, at least one instantiated element corresponding to each of the links between the instantiated elements needs to implement a tapping function. Hence, Operations 1006-1014 are iterated with respect to each link, between the instantiated elements, that is mapped to the particular link identified in the tap request. Operations 1006-1014 are iterated such that a source and/or destination element, corresponding to each link, implements a tapping function. The tapped data, associated with each link, may be transmitted to the same virtual endpoint and/or different virtual endpoints.

Referring to FIGS. 7 and 8 as an example, a user may request to tap a link 732 between VTEs 712-714 in the virtual topology 700. The link 732 maps to the links 832-834 between instantiated elements in a physical topology. The instantiated 714a, corresponding to the link 832, may implement the tapping function 828a. The instantiated 714b, corresponding to the link 834, may implement the tapping function 828b. After the implementation of the tapping functions 828a-b, at least one instantiated element corresponding to each link 832-834 implements a tapping function. There is no need to implement a tapping function on any other instantiated elements.

One or more embodiments include aggregating the tapped data transmitted from one or more source and/or destination elements (Operation 1018). A source and/or destination element applies a tapping function to transmit tapped data to a virtual endpoint, as described above with reference to Operations 1008 and 1012. The virtual endpoint transmits the tapped data to a tap aggregator and/or another component of a tapping infrastructure.

A tap aggregator may receive tapped data from one or more virtual endpoints. The tapped data may correspond to one or more links between the instantiated elements. The tap aggregator aggregates the tapped data corresponding to multiple links.

As an example, a tap aggregator may receive multiple streams of tapped data, each stream corresponding to a different link between instantiated elements. The tap aggregator may determine a chronological order in which the streams of tapped data are received. The tap aggregator may generate a single stream of data, including all streams of tapped data, in accordance with the chronological order.

As another example, a tap aggregator may receive multiple streams of tapped data, each stream corresponding to a different link between instantiated elements. The tap aggregator may determine a statistic associated with the multiple streams of tapped data. Examples of statistics include a total amount of data transmitted in the multiple streams of tapped data, and a total number of errors included in the multiple streams of tapped data.

One or more embodiments include presenting information regarding the particular link between the set of VTEs based on the aggregated tapped data (Operation 1020). A user interface engine receives the aggregated tapped data from the tap aggregator and/or another component of the tapping infrastructure. Based on the aggregated tapped data, the user interface engine presents information regarding the particular link identified in the tap request. As an example, the user interface engine may present the aggregated tapped data itself. As another example, the user interface engine may present a statistic associated with the aggregated tapped data. As another example, the user interface engine may present an alert in response to determining that a triggering event is satisfied by the aggregated tapped data. The user interface engine may present the alert, for example, if the total amount of tapped data is above a specified threshold value.

B. Implementing a Tapping Function by a Tapping Element

Figure 11:
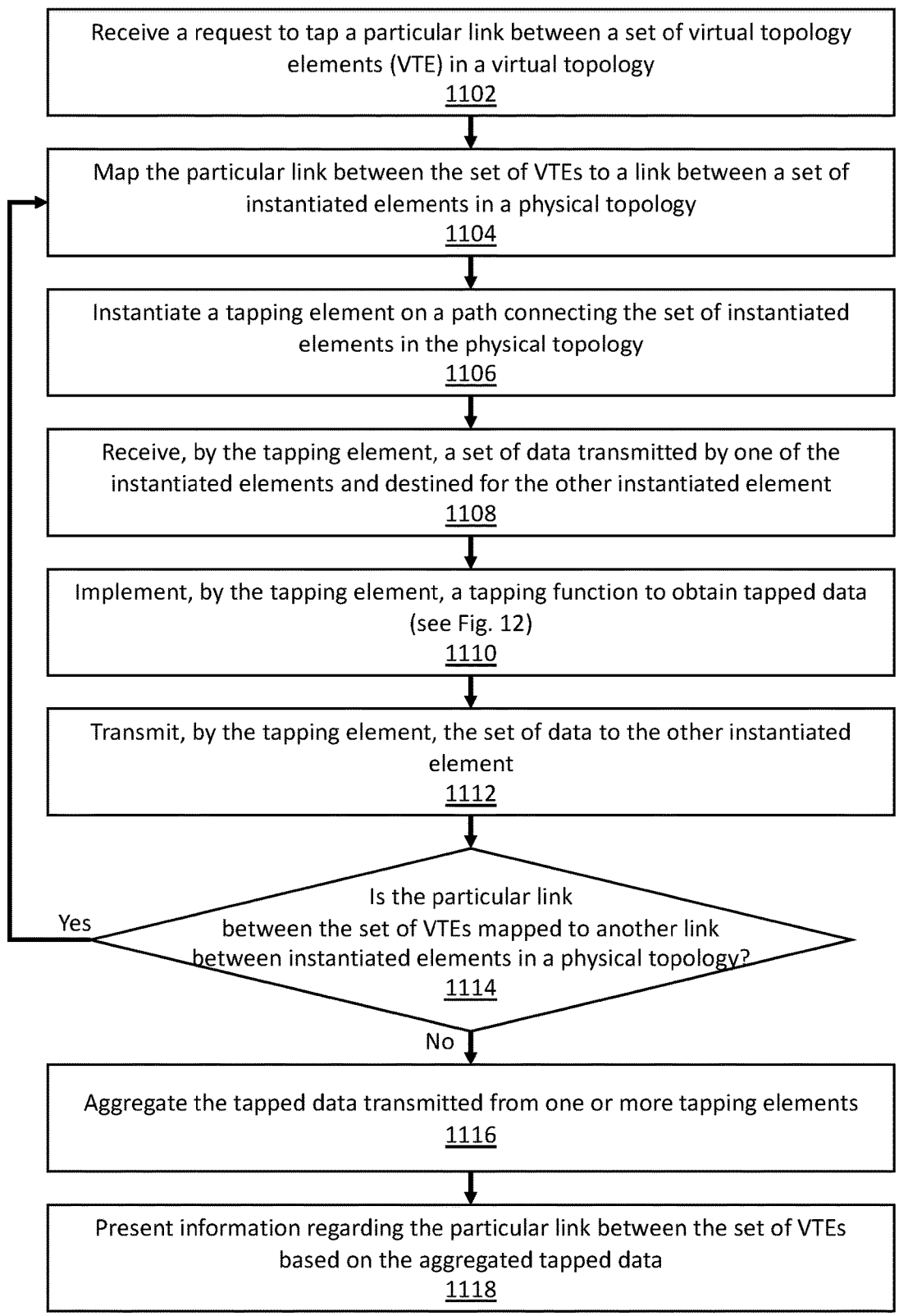
FIG. 11 illustrates an example set of operations for implementing tapping functions by one or more tapping elements in a physical topology, in accordance with one or more embodiments.

FIG. 11 illustrates an example set of operations for implementing tapping functions by one or more tapping elements in a physical topology, in accordance with one or more embodiments. One or more operations illustrated in FIG. 11 may be modified, rearranged, or omitted all together. Accordingly, the particular sequence of operations illustrated in FIG. 11 should not be construed as limiting the scope of one or more embodiments.

One or more embodiments include receiving a request to tap a particular link between a set of virtual topology elements (VTEs) in a virtual topology (Operation 1102). Descriptions regarding receiving a request to tap a particular link between a set of VTEs are included above with reference to Operation 1002.

One or more embodiments include mapping the particular link between the set of VTEs to a link between a set of instantiated elements in a physical topology (Operation 1104). Descriptions regarding mapping the particular link between the VTEs to a link between a set of instantiated elements are included above with reference to Operation 1004.

One or more embodiments include instantiating a tapping element on a path connecting the set of instantiated elements in the physical topology (Operation 1106). A generic machine, in the physical topology, instantiates the tapping element. The forwarding policies of one or more instantiated elements, identified at Operation 1104, are modified. The modified forwarding policy, of a particular instantiated element, is applied to data that is destined for the other instantiated element. In particular, the modified forwarding policy routes the data to the tapping element, rather than the other instantiated element. Based on the modified forwarding policy, the particular instantiated element transmits data, that is destined for the other instantiated element, to the tapping element.

Referring to FIGS. 7 and 9 as an example, a user may request to tap a link 732 between VTEs 712-714 in the virtual topology 700. The link 732 is mapped to a link connecting the instantiated VTEs 712-714 in a physical topology. A tapping element 930 is instantiated on the path connecting the instantiated VTEs 712-714 in a physical topology. Hence, a link 932 connects the instantiated VTE 712 and the tapping element. A link 934 connects the tapping element 930 and the instantiated VTE 714. A forwarding policy of the instantiated VTE 712 is modified. The modified forwarding policy routes data, that is destined for the instantiated VTE 714, to the tapping element 930.

One or more embodiments include receiving a set of data transmitted by one of the instantiated elements and destined for the other instantiated element (Operation 1108). The tapping element receives the set of data that is transmitted by one of the instantiated elements and destined for the other instantiated element. The tapping element receives the set of data based on the modified forwarding policy, as described above with reference to Operation 1106.

One or more embodiments include implementing a tapping function to obtain tapped data (Operation 1110). The tapping element applies the tapping function to the set of data received by the tapping element. A middlebox and/or a gateway associated with the tapping element may implement the tapping function. Based on the tapping function, the tapping element transmits tapped data to a virtual endpoint. Examples of operations for applying the tapping function to a set of data are described below with reference to FIG. 12.

One or more embodiments include transmitting the set of data to the other instantiated element (Operation 1112). As described above with reference to Operation 1108, the tapping element receives a set of data that is transmitted by one of the instantiated elements and destined for the other instantiated element. The tapping element transmits the set of data to the other instantiated element. Hence, the tapping element transmits both (a) tapped data to the virtual endpoint, as described above with reference to Operation 1110, and (b) the set of data, that is destined for the other instantiated element, to the other instantiated element.

The tapping function does not modify any network data being transmitted between the instantiated elements. Regardless of whether the tapping element implements the tapping function, one instantiated element transmits the same set of data. Regardless of whether the tapping element implements the tapping function, the other instantiated element receives the same set of data.

Referring to FIGS. 7 and 9 as an example, a user may request to tap a link 732 between VTEs 712-714 in the virtual topology 700. A tapping element 930 is instantiated, connecting the instantiated VTE 712 and the instantiated VTE 714. The instantiated VTE 712 transmits a set of data, destined for the instantiated VTE 714, to the tapping element 930. The tapping element 930 applies a tapping function 928 to the set of data to obtain tapped data, which is transmitted to a virtual endpoint 920. Additionally, the tapping element 930 transmits the set of data to the instantiated VTE 714.

One or more embodiments include determining whether the particular link between the set of VTEs maps to another link between instantiated elements in the physical topology (Operation 1114). Descriptions regarding mapping the particular link between the VTEs to a link between a set of instantiated elements are included above with reference to Operation 1004. Multiple links, between instantiated elements, may map to the particular link identified in the tap request. Operations 1104-1112 are iterated with respect to each of the links between the instantiated elements.

One or more embodiments include aggregating the tapped data transmitted from one or more tapping elements (Operation 1116). Descriptions regarding aggregating the tapped data are included above with reference to Operation 1018.

One or more embodiments include presenting information regarding the particular link between the set of VTEs based on the aggregated tapped data (Operation 1118). Descriptions regarding presenting information regarding the particular link identified in the tap request are included above with reference to Operation 1020.

C. Applying a Tapping Function

Figure 12:
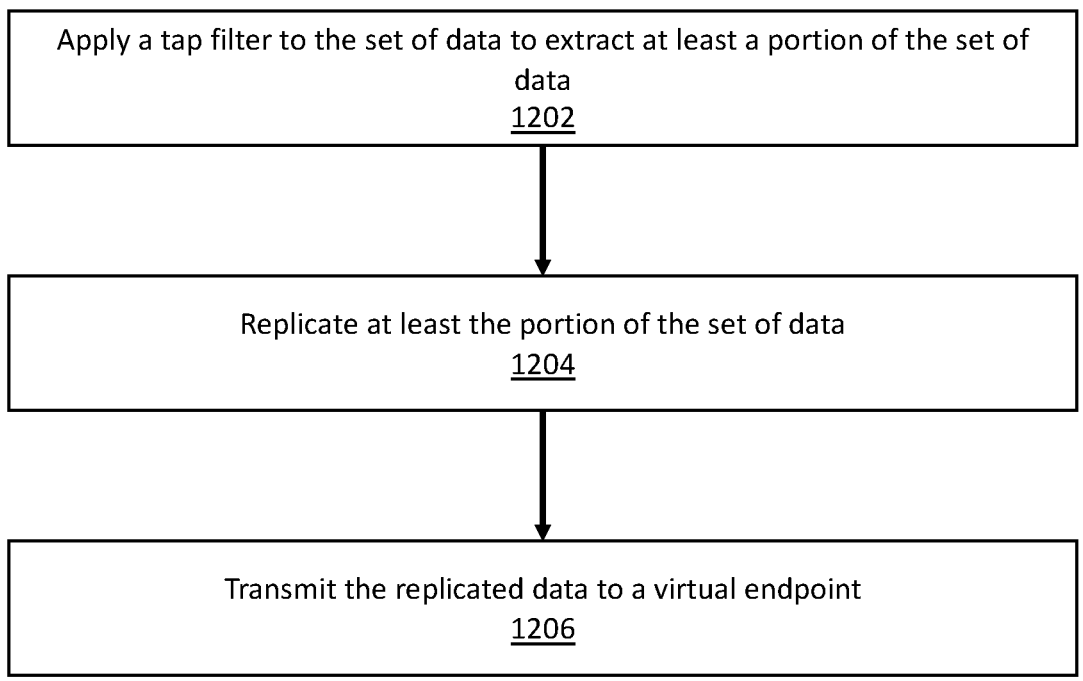
FIG. 12 illustrates an example set of operations for applying a tapping function on a set of data, in accordance with one or more embodiments.

FIG. 12 illustrates an example set of operations for applying a tapping function on a set of data, in accordance with one or more embodiments. A source element may execute the operations illustrated in FIG. 12 as part of Operation 1008 of FIG. 10. Additionally or alternatively, a destination element may execute the operations illustrated in FIG. 12 as part of Operation 1012 of FIG. 10. Additionally or alternatively, a tapping element may execute the operations illustrated in FIG. 12 as part of Operation 1110 of FIG. 11. One or more operations illustrated in FIG. 12 may be modified, rearranged, or omitted all together. Accordingly, the particular sequence of operations illustrated in FIG. 12 should not be construed as limiting the scope of one or more embodiments.

One or more embodiments include applying a tap filter to the set of data to extract at least a portion of the set of data (Operation 1202). A filtering policy for the tap filter may be obtained via a user interface and/or another application. The filtering policy specifies criteria for identifying data that is blocked by the tap filter. Additionally or alternatively, the filtering policy specifies criteria for identifying data that is allowed to pass through the tap filter. A tapping element (or a source element or a destination element that implements a tapping function) applies the tap filter to the set of data.

As an example, a tapping element may apply a tapping function to a set of data. The tapping function may include applying a tap filter to block confidential network data from entering a tapping infrastructure. Based on the tap filter, the tapping element may analyze the set of data to determine whether any data is associated with a confidential flag. The tapping element blocks data associated with a confidential flag from passing through the tap filter. The tapping element does not execute Operations 1204-1206 with respect to data associated with a confidential flag. Conversely, the tapping element executes Operations 1204-1206 with respect to data not associated with a confidential flag.

In an embodiment, the tapping function does not include applying a tap filter. Additionally or alternatively, a filtering policy may allow all data to pass through a tap filter.

One or more embodiments include replicating at least the portion of the set of data (Operation 1204). The tapping element (or the source element or the destination element that implements a tapping function) replicates the portion of data that passes through the tap filter. Replication includes making an additional copy of the data that passes through the tap filter.

One or more embodiments include transmitting the replicated data to a virtual endpoint (Operation 1206). The tapping element (or the source element or the destination element that implements a tapping function) transmits the replicated data to the virtual endpoint. The replicated data may be referred to as "tapped data." The virtual endpoint may by, for example, a virtual network interface. The virtual endpoint connects to a tapping infrastructure.

In an embodiment, the source element or the destination element implements the tapping function. The source element generates metadata indicating that the replicated data is associated with the source element. Alternatively, the destination element generates metadata indicating that the replicated data is associated with the destination element. The source element or the destination element transmits both the replicated data and the metadata to the virtual endpoint.

In an embodiment, the tapping element (or the source element or the destination element that implements a tapping function) transmits the tapped data to the virtual endpoint via a particular overlay network. The virtual endpoint receives the tapped data including an encapsulation header corresponding to the particular overlay network. Meanwhile, the virtual endpoint transmits the tapped data to the tapping infrastructure via a different overlay network, which may be referred to as a "tapping overlay network." The virtual endpoint replaces the encapsulation header corresponding to the particular overlay network with an encapsulation header corresponding to the tapping overlay network. The tapped data is routed to the tapping infrastructure based on the encapsulation header corresponding to the tapping overlay network.

5. Computer Networks

In one or more embodiments, a computer network provides connectivity among a set of nodes. The set of nodes are connected by a set of links. The nodes may be local to and/or remote from each other. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a service provider provides a computer network to one or more end users. Various service models may be implemented by the computer network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, and/or tenant isolation.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 13:
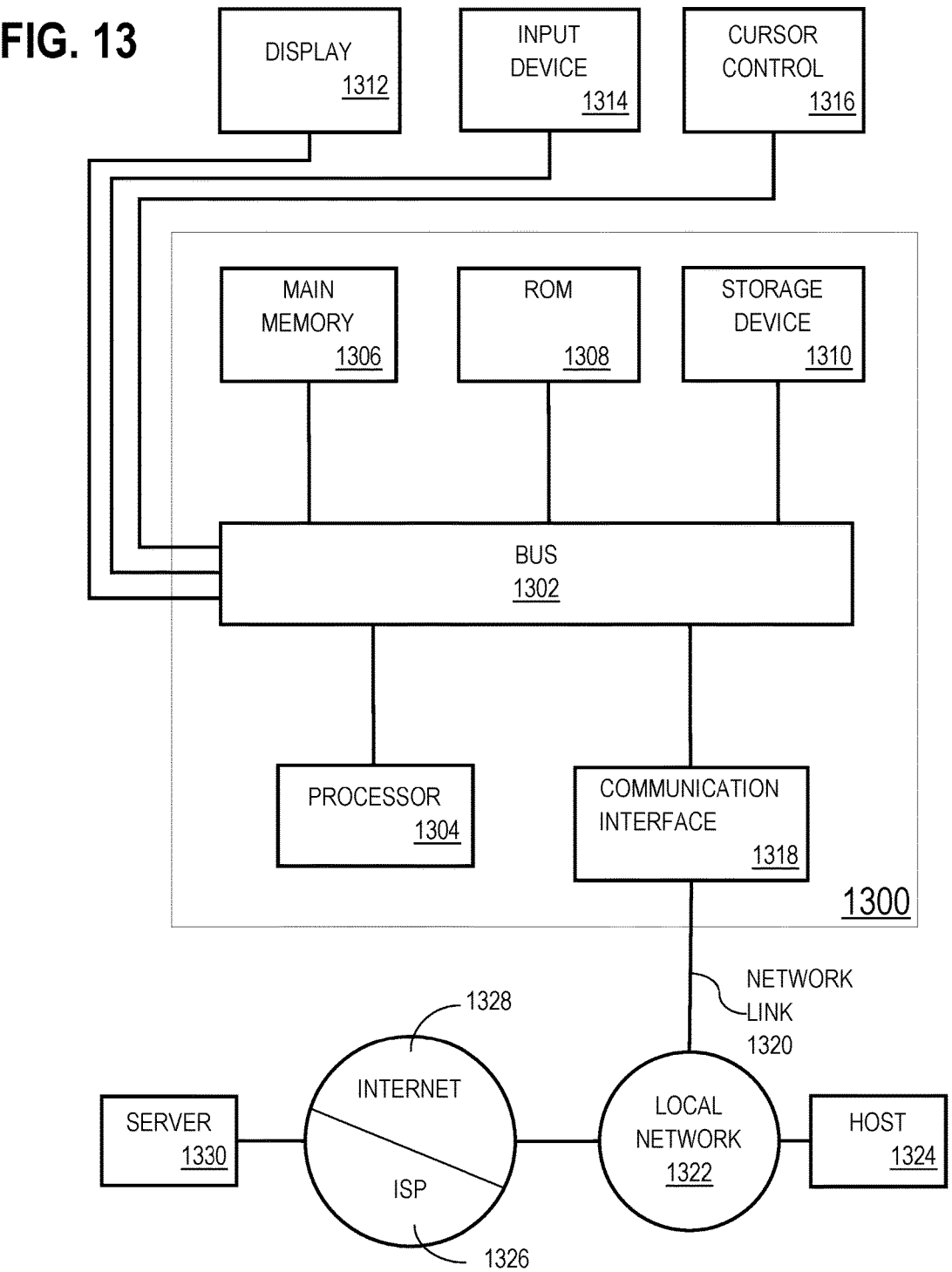
FIG. 13 shows a block diagram that illustrates a computer system in accordance with one or more embodiments.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk or optical disk, is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
   mapping a particular link between a set of virtual topology elements (VTEs) in a virtual topology to one or more links between a set of instantiated elements in a physical topology;
   identifying a first set of data that is received by a first instantiated element, of the set of instantiated elements, and destined for a second instantiated element in the physical topology;
   executing, by the first instantiated element, a first tapping function, wherein the first tapping function comprises:
      replicating the first set of data received by the first instantiated element;
      transmitting the replicated first set of data to a virtual endpoint; and
   transmitting, by the first instantiated element, at least a portion of the first set of data to the second instantiated element.

2. The medium of claim 1, wherein the first tapping function further comprises:
   prior to replicating the first set of data received by the first instantiated element: applying a tap filter to a superset of data, received by the first instantiated element and destined for the second instantiated element, to extract the first set of data from the superset of data.

3. The medium of claim 1, wherein transmitting, by the first instantiated element, the portion of the first set of data to the second instantiated element comprises: applying a firewall filter to the first set of data to extract the portion of the first set of data.

4. The medium of claim 1, wherein transmitting, by the first instantiated element, the portion of the first set of data to the second instantiated element comprises:
   determining the portion of the first set of data to be transmitted based on a function of a VTE corresponding to the first instantiated element; and
   transmitting the portion of the first set of data to the second instantiated element.

5. The medium of claim 4, wherein the function of the VTE corresponding to the first instantiated element is specified in the virtual topology.

6. The medium of claim 1, wherein the first set of data is determined based on a function of a VTE corresponding to the first instantiated element.

7. The medium of claim 1, wherein:
   the operations further comprise:
      identifying a second set of data that is received by a third instantiated element, of the set of instantiated elements, and destined for a fourth instantiated element in the physical topology;
      executing, by the third instantiated element, a second tapping function, wherein the second tapping function comprises:
         replicating the second set of data received by the third instantiated element;
         transmitting the replicated second set of data to the virtual endpoint;
      transmitting, by the third instantiated element, the second set of data to the fourth instantiated element; and
   the replicated first set of data and the replicated second set of data are aggregated at the virtual endpoint.

8. The medium of claim 1, wherein the first tapping function further comprises:
   generating metadata indicating that the replicated first set of data is associated with the first instantiated element; and
   transmitting both the replicated first set of data and the metadata to the virtual endpoint.

9. The medium of claim 1, wherein the operations further comprise:
   transmitting the replicated first set of data to a tap aggregator.

10. The medium of claim 1, wherein the operations further comprise:
    presenting information regarding the particular link between the set of VTEs in the virtual topology based on the replicated first set of data.

11. The medium of claim 1, wherein the first tapping function does not modify any data being transmitted between the set of instantiated elements.

12. The medium of claim 1, wherein the first tapping function is executed by a middlebox associated with the first instantiated element.

13. The medium of claim 1, wherein the first tapping function is executed by a gateway associated with the first instantiated element.

14. The medium of claim 1, wherein the virtual endpoint is a virtual network interface.

15. The medium of claim 1, wherein:
    the first set of data is determined based on a function of a VTE corresponding to the first instantiated element;
    the first tapping function further comprises:
       prior to replicating the first set of data received by the first instantiated element: applying a tap filter to a superset of data, received by the first instantiated element and destined for the second instantiated element, to extract the first set of data from the superset of data;
       generating metadata indicating that the replicated first set of data is associated with the first instantiated element;
       transmitting both the replicated first set of data and the metadata to the virtual endpoint;
    the first tapping function does not modify any data being transmitted between the set of instantiated elements;
    the first tapping function is executed by a middlebox associated with the first instantiated element;
    the virtual endpoint comprises a virtual network interface;
    the operations further comprise:
       identifying a second set of data that is received by a third instantiated element, of the set of instantiated elements, and destined for a fourth instantiated element in the physical topology;
       executing, by the third instantiated element, a second tapping function, wherein the second tapping function comprises:
          replicating the second set of data received by the third instantiated element;
          transmitting the replicated second set of data to the virtual endpoint;

transmitting, by the third instantiated element, the second set of data to the fourth instantiated element;

transmitting the replicated first set of data and the replicated second set of data to a tap aggregator; and presenting information regarding the particular link between the set of VTEs in the virtual topology based on the replicated first set of data.

16. A system comprising:

at least one device including a hardware processor; and the system is configured to perform operations comprising:

mapping a particular link between a set of virtual topology elements (VTEs) in a virtual topology to one or more links between a set of instantiated elements in a physical topology;

identifying a first set of data that is received by a first instantiated element, of the set of instantiated elements, and destined for a second instantiated element in the physical topology;

executing, by the first instantiated element, a first tapping function, wherein the first tapping function comprises:

replicating the first set of data received by the first instantiated element;

transmitting the replicated first set of data to a virtual endpoint; and transmitting, by the first instantiated element, at least a portion of the first set of data to the second instantiated element.

17. The system of claim 16, wherein the first tapping function further comprises:

prior to replicating the first set of data received by the first instantiated element: applying a tap filter to a superset of data, received by the first instantiated element and destined for the second instantiated element, to extract the first set of data from the superset of data.

18. A non-transitory computer readable medium comprising instructions which, when executed by one or more hardware processors, cause performance of operations comprising:

mapping a particular link between a set of virtual topology elements (VTEs) in a virtual topology to one or more links between a set of instantiated elements in a physical topology;

identifying a set of data that is received by a first instantiated element, of the set of instantiated elements, and destined for a second instantiated element, of the set of instantiated elements;

transmitting, by the first instantiated element, the set of data to an intermediate element that is not one of the set of instantiated element;

executing, by the intermediate element, a tapping function, wherein the tapping function comprises at least:

replicating a set of data received by the intermediate element;

transmitting the replicated set of data to a virtual endpoint; and transmitting, by the intermediate element, the set of data to the second instantiated element.

19. The medium of claim 18, wherein the tapping function further comprises:

prior to replicating the set of data received by the intermediate element: applying a tap filter to a superset of data, received by the intermediate element, to extract the set of data from the superset of data.

20. The medium of claim 18, wherein the operations further comprise:

presenting information regarding the particular link between the set of VTEs in the virtual topology based on the replicated set of data.

* * * * *